(12) United States Patent
Wang et al.

(10) Patent No.: US 10,809,474 B2
(45) Date of Patent: Oct. 20, 2020

(54) SMALL FOOTPRINT PARALLEL OPTICS TRANSCEIVERS

(71) Applicant: Finisar Corporation, Sunnyvale, CA (US)

(72) Inventors: William H. Wang, Pleasanton, CA (US); Shamei Shi, Shanghai (CN); Joshua Moore, Ontario (CA)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

(21) Appl. No.: 16/219,065

(22) Filed: Dec. 13, 2018

(65) Prior Publication Data

US 2019/0187392 A1 Jun. 20, 2019

Related U.S. Application Data

(60) Provisional application No. 62/607,168, filed on Dec. 18, 2017.

(51) Int. Cl.
*G02B 6/43* (2006.01)
*G02B 6/42* (2006.01)
(Continued)

(52) U.S. Cl.
CPC ............ *G02B 6/43* (2013.01); *G02B 6/381* (2013.01); *G02B 6/3825* (2013.01);
(Continued)

(58) Field of Classification Search
CPC ........ G02B 6/43; G02B 6/381; G02B 6/3825; G02B 6/3893; G02B 6/3897; G02B 6/403;
(Continued)

(56) References Cited

U.S. PATENT DOCUMENTS

| 6,454,464 B1* | 9/2002 | Nolan | G02B 6/3807 385/60 |
| 2005/0148223 A1* | 7/2005 | Shirk | G02B 6/4246 439/160 |

(Continued)

FOREIGN PATENT DOCUMENTS

EP 2470933 A1 7/2012

OTHER PUBLICATIONS

International Search Report and Written Opinion dated Apr. 5, 2019, in related PCT Application No. PCT/US2018/065827.

*Primary Examiner* — Peter Radkowski
(74) *Attorney, Agent, or Firm* — Maschoff Brennan

(57) ABSTRACT

An alignment connector for an optoelectronic module can include: a front end having a first gripper arm and a second gripper arm with an alignment connector aperture between the first gripper arm and the second gripper arm; a base having a bottom surface and a receptacle surface; the back end having a first back wall and a second back wall with a back gap therebetween; and a ferrule receptacle extending to a medial region where the alignment connector aperture extends from, and including a portion of the receptacle surface, the ferrule receptacle being defined by a first side wall having a first latch arm and a second side wall having a second latch arm. The alignment connector can be included in a module with a bail or pull-tab. Alternatively, the first gripper arm and second gripper arm can be mounted directly to a module housing.

19 Claims, 17 Drawing Sheets

(51) Int. Cl.
*G02B 6/38* (2006.01)
*G02B 6/40* (2006.01)

(52) U.S. Cl.
CPC ......... *G02B 6/3893* (2013.01); *G02B 6/3897* (2013.01); *G02B 6/403* (2013.01); *G02B 6/422* (2013.01); *G02B 6/4246* (2013.01); *G02B 6/4256* (2013.01); *G02B 6/4261* (2013.01); *G02B 6/4292* (2013.01); *G02B 6/3885* (2013.01)

(58) Field of Classification Search
CPC .... G02B 6/422; G02B 6/4246; G02B 6/4256; G02B 6/4261; G02B 6/4297; G02B 6/3885
See application file for complete search history.

(56) References Cited

U.S. PATENT DOCUMENTS

| | | |
|---|---|---|
| 2008/0044143 A1 | 2/2008 | Wang et al. |
| 2011/0081119 A1 | 4/2011 | Togami et al. |
| 2014/0219615 A1 | 8/2014 | Petersen et al. |
| 2015/0180578 A1* | 6/2015 | Leigh .................. G02B 6/4293 398/135 |
| 2015/0293315 A1 | 10/2015 | Oki et al. |
| 2016/0266340 A1* | 9/2016 | Zhang .................. G02B 6/4277 |

* cited by examiner

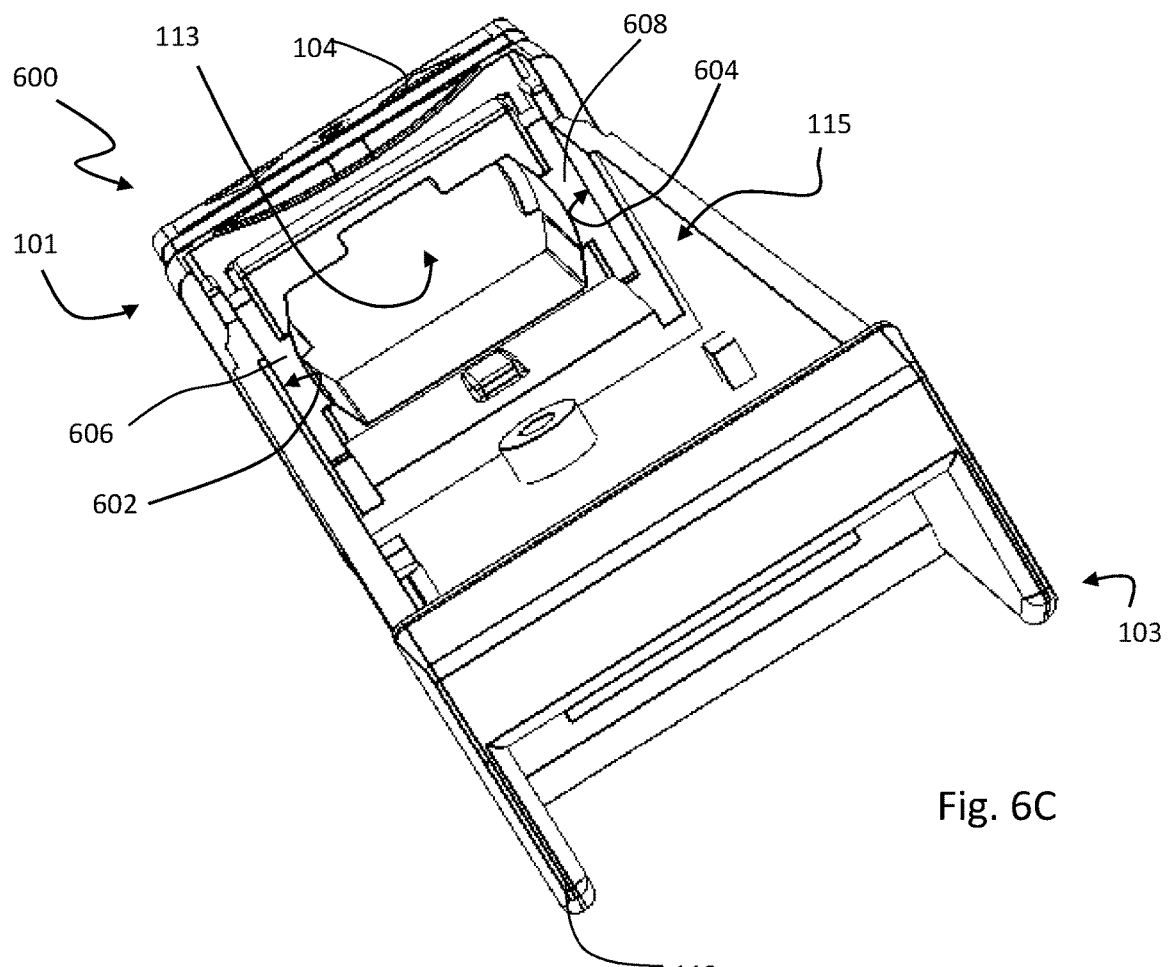
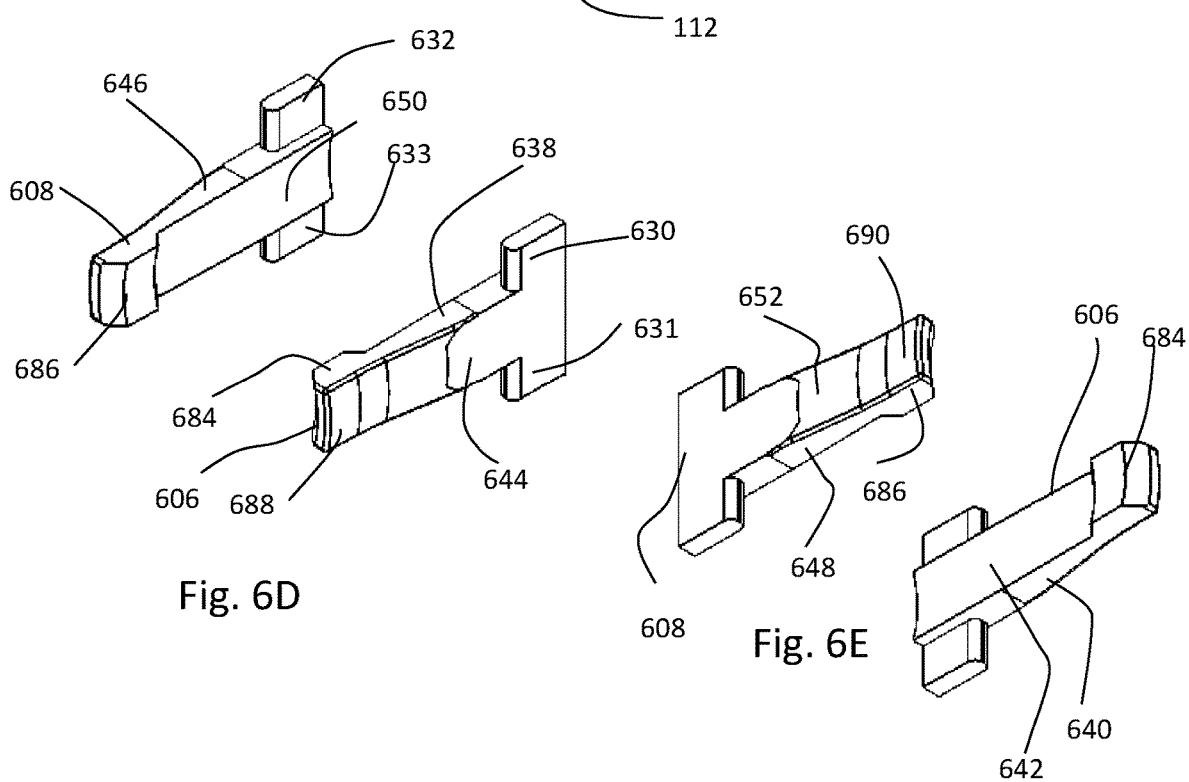
Fig. 6C
Fig. 6D
Fig. 6E

SMALL FOOTPRINT PARALLEL OPTICS TRANSCEIVERS

CROSS-REFERENCE

This patent application claims priority to U.S. Provisional Application No. 62/607,168 filed Dec. 18, 2017, which provisional is incorporated herein by specific reference in its entirety.

FIELD

Some embodiments relate generally to optoelectronic modules. More particularly, example embodiments relate to connectors for connecting fiber optic communication cables to optoelectronic modules.

BACKGROUND

Communication modules, such as electronic or optoelectronic transceiver, or transponder modules, are increasingly used in electronic and optoelectronic communication. Some modules are pluggable, which permits the module to be inserted into and removed from a cage of a host device, such as a host computer, switching hub, network router, or switch box. Each module typically communicates with a printed circuit board of the host device by transmitting and/or receiving electrical data signals to and/or from the host device printed circuit board. These electrical data signals can also be transmitted by the module outside of the host device as optical and/or electrical data signals. Active cables include communication cables with communication modules at one or both ends of the communication cables. Some communication modules include a multi-fiber push on ("MPO")-style male connector for receiving an MPO-style female connector that is attached to the communication cable.

Some data transmission involves the conversion of optical signals to electrical signals and/or electrical signals to optical signals. In some applications, the conversion occurs at a circuit board. For example, an optical cable carrying one or more optical signals may interface with an optoelectronic module, such as a board-mounted optical assembly (BOA) such as an optical engine; or a pluggable optoelectronic module, such as an XFP, a QSFP, a SFP+, or other pluggable optoelectronic module. At the BOA, the optical signals may be transduced from optical signals to electrical signals using optical receivers. The electrical signals may then be communicated along etched copper traces integrated into the circuit board to a destination. Likewise, electrical signals may be communicated along etched copper traces to the BOA. At the BOA, the electrical signals may be transduced to optical signals by optical transmitters. The optical signals may then be further communicated along the same or a different optical cable that interfaces with the optoelectronic module.

In some BOAs, a lens assembly may be configured to receive an optical interface such as a cable connector. The optical interface generally supports one or more optical fibers that communicate the optical data to and from the BOA. One of the shortcomings of communication modules is that they may include many optically and electrically conductive components, as well as many mechanical components, that may require significant manufacturing processes.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

In some embodiments, an alignment connector is configured for an optoelectronic module, where the alignment connector includes a unitary alignment connector body that has: a front end having a first gripper arm on a first side and a second gripper arm on a second side with an alignment connector aperture between the first gripper arm and the second gripper arm; a base extending from the front end to the back end and from the first side to the second side, wherein the base has a bottom surface and a receptacle surface extending from the front end to the back end; where the back end has a first back wall and a second back wall with a back gap therebetween; and a ferrule receptacle extending from the first back wall and the second back wall to a medial region where the alignment connector aperture extends from, and including a portion of the receptacle surface, the ferrule receptacle being defined by a first side wall having a first latch arm and a second side wall having a second latch arm. In some aspects, the first gripper arm and the second gripper arm are each laterally flexible relative to a longitudinal axis that extends from the front end to the back end. In some aspects, the first gripper arm has a top surface and an opposite bottom surface with an internal surface and an external surface; and the second gripper arm has a top surface and an opposite bottom surface with an internal surface and an external surface. In some aspects, the first gripper arm extends from a first side region of the body; and the second gripper arm extends from a second side region of the body.

In some embodiments, the top surface of the first gripper arm is exposed to a first top gap between the first gripper arm and a first top portion of the body; the bottom surface of the first gripper arm is exposed to a first bottom gap between the first gripper arm and a first bottom portion of the body; the top surface of the second gripper arm is exposed to a second top gap between the second gripper arm and a second top portion of the body; and the bottom surface of the second gripper arm is exposed to a second bottom gap between the second gripper arm and a second bottom portion of the body.

In some embodiments, wherein the alignment connector aperture is defined at least partially by: the bottom aperture surface at a bottom; the first gripper arm, the first top portion, and the first bottom portion on the first side; the second gripper arm, the second top portion, and the second bottom portion on the second side, and a first top aperture surface, a second top aperture surface, and a top aperture recess surface of a top aperture recess at a top. In some aspects, the top aperture recess is defined by a raised top portion. In some aspects, the first gripper arm includes a first inner protrusion on the first internal surface at an end opposite from the first side region of the body; and the second gripper arm includes a second inner protrusion on the second internal surface at an end opposite from the second side region of the body. In some aspects, the first gripper arm includes a first indent on the first external surface opposite of the first inner protrusion; and the second gripper arm includes a second indent on the second external surface opposite of the second inner protrusion.

In some embodiments, the ferrule receptacle includes: the first latch arm having a first latch protrusion extending inwardly at an angle from an inner surface of the first latch arm; and the second latch arm having a second latch protrusion extending inwardly at an angle from an inner surface of the second latch arm, such that the first latch protrusion and second latch protrusion are generally pointing at each other. In some aspects, the angle of the first latch protrusion is substantially orthogonal; and the angle of the second latch protrusion is substantially orthogonal.

In some embodiments, the first side wall includes a first wing extending outwardly at an angle from an outer surface of the first side wall; and the second side wall includes a second wing extending outwardly at an angle from an outer surface of the second side wall. In some aspects, the angle of the first wing is substantially orthogonal; and the angle of the second wing is substantially orthogonal.

In some embodiments, the receptacle surface includes: a ferrule body surface between the first latch arm and the second latch arm; and a ferrule bracket recess between the ferrule body surface and both the first back wall and the second back wall. In some aspects, the body includes a stop lip between the ferrule body surface and the alignment connector aperture, the stop lip being laterally oriented relative to the longitudinally oriented ferrule body surface and the bottom aperture surface thereby functioning to stop longitudinal movement of a plug located in the alignment connector aperture, the stop lip being U-shaped in lateral cross-section.

In some embodiments, an optoelectronic module can include: a housing having an interior cavity with a connector end opening at a front end; an alignment connector at least partially located in the interior cavity and extending through and out of the connector end opening, wherein the alignment connector includes a unitary alignment connector body that comprises: a front end having a first gripper arm on a first side and a second gripper arm on a second side with an alignment connector aperture between the first gripper arm and the second gripper arm; a base extending from the front end to the back end and from the first side to the second side, the base having a bottom surface and a receptacle surface extending from the front end to the back end; the back end having a first back wall and a second back wall with a back gap; a ferrule receptacle extending from the first back wall and the second back wall to a medial region where the alignment connector aperture extends from, and including a portion of the receptacle surface, the ferrule receptacle being defined by a first side wall having a first latch arm and a second side wall having a second latch arm. In some aspects, the optoelectronic module can include one or more features of one of the figures or known optoelectronic modules, such as internal components for operation of the optoelectronic module.

In some embodiments, the optoelectronic module can include a connector ferrule located in the ferrule receptacle. In some aspects, the first latch arm and the second latch arm cooperate to retain the connector ferrule in the ferrule receptacle. In some aspects, the first latch protrusion and the second latch protrusion cooperate to hold a top surface of the connector ferrule. In some aspects, the ferrule body surface interfaces with a bottom surface of the connector ferrule and the ferrule bracket recess interfaces with a bracket of the connector ferrule. In some aspects, a ferrule optical fiber connected at an end to the connector ferrule extends through the back gap between the first back wall and the second back wall. In some aspects, the ferrule optical fiber is connected at an end to a lens ferrule of the ferrule assembly, and the lens ferrule is optically coupled with a transmitter array of a PCB.

In some embodiments, the connector ferrule includes a first guide pin and a second guide pin, wherein the first guide pin and the second guide pin extend out of the connector ferrule for guiding alignment of a connector head therewith.

In some embodiments, a bail is located at the front end of the housing of the optoelectronic module. In some aspects, the bail includes a first arm connected to a first end of a cross arm and a second arm connected to a second end of the cross arm. In some aspects, the first arm includes a first latch aperture opposite of the first end of the cross arm and the second arm includes a second latch aperture opposite of the second end of the cross arm. In some aspects, the bail includes a pivot latch operably coupled with the bail to allow for rotation of the bail relative to the alignment connector aperture. In some aspects, the pivot latch includes a first axel in the first latch aperture and a second axel in the second latch aperture.

In some embodiments, a housing of the optoelectronic module can have a top shell coupled with a bottom shell. In some aspects, the optoelectronic module can include an EMF collar around the housing near a housing head. In some aspects, the bail is in a retracted position and is adjacent to the housing head opposite of an EMF collar. In some aspects, the optoelectronic module can include an edge connector of the PCB extending through a back aperture of the back of the housing.

In some embodiments, a pull-tab is located at the front end of the housing of the optoelectronic module. The pull-tab can be used in place of the bail. In some aspects, the pull-tab is oriented along a longitudinal axis of the housing along with the first gripper arm and the second gripper arm. In some aspects, the pull-tab includes mounting components mounted to a bottom of the housing. In some aspects, the pull-tab is mounted to a bottom shell of the housing. In some aspects, the pull-tab includes an elongated region and an end region. In some aspects, the end region includes a tab aperture.

In some embodiments, an optoelectronic module can include: a housing having an interior cavity with a connector end opening at a front end; a first gripper slot formed into the housing and extending from the connector end opening into the interior cavity; a first gripper arm located in the first gripper slot so as to extend out of the connector end opening; a second gripper slot formed into the housing and extending from the connector end opening into the interior cavity; and a second gripper arm located in the second gripper slot so as to extend out of the connector end opening. In some aspects, the first gripper slot is at least partially defined by a first top surface and a first bottom surface; and the second gripper slot is at least partially defined by a second top surface and a second bottom surface. In some aspects, the first gripper slot has a first gap at the front end extending to a first slot side wall; and the second gripper slot has a second gap at the front end extending to a second slot side wall. In some aspects, the first gripper arm and the second gripper arm are each laterally flexible relative to a longitudinal axis that extends from the front end to the back end. In some aspects, the first gripper arm has a top surface and an opposite bottom surface with an internal surface and an external surface; and the second gripper arm has a top surface and an opposite bottom surface with an internal surface and an external surface. In some aspects, the first gripper arm extends from a first side region of the housing; and the second gripper arm extends from a second side region of the housing.

In some embodiments, a front portion of the external surface of the first gripper arm is exposed to the first gap; a back portion of the external surface of the first gripper arm is on the first slot side wall; a front portion of the external surface of the second gripper arm is exposed to the second gap; and a back portion of the external surface of the second gripper arm is on the second slot side wall. In some aspects, the first gripper arm includes a first inner protrusion on the first internal surface at a first end; and the second gripper arm includes a second inner protrusion on the second internal surface at a first end. In some aspects, the first gripper arm includes a first indent on the first external surface opposite of the first inner protrusion; and the second gripper arm includes a second indent on the second external surface opposite of the second inner protrusion. In some aspects, the first gripper slot has a first top notch and a first bottom notch, wherein the first top notch and the first bottom notch extend away from each other and at an angle from the first gripper slot; and the second gripper slot has a second top notch and a second bottom notch, wherein the second top notch and the second bottom notch extend away from each other and at an angle from the second gripper slot. In some aspects, the first gripper arm includes a first top wing located in the first top notch and a first bottom wing located in the first bottom notch; and the second gripper arm includes a second top wing located in the second top notch and a second bottom wing located in the second bottom notch.

In some embodiments, the optoelectronic module may include a pullout member at the front of the housing, such as a bail or a pull-tab. The bail and pull tab can be configured as described herein. The optoelectronic module may also include the top shell and bottom shell, as well as the EMF collar, EMF shield, back aperture, and any other feature described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 6C is an end perspective view of the example bail-type optoelectronic module of FIG. 6A with components removed to show the separate gripper arms in the gripper arm slots of the housing;

FIG. 6D is a right perspective view of the separate gripper arms of the example bail-type optoelectronic module of FIG. 6A without the housing.

FIG. 6E is a left perspective view of the separate gripper arms of the example bail-type optoelectronic module of FIG. 6A without the housing.

DESCRIPTION OF SOME EXAMPLE EMBODIMENTS

Figure 1A:
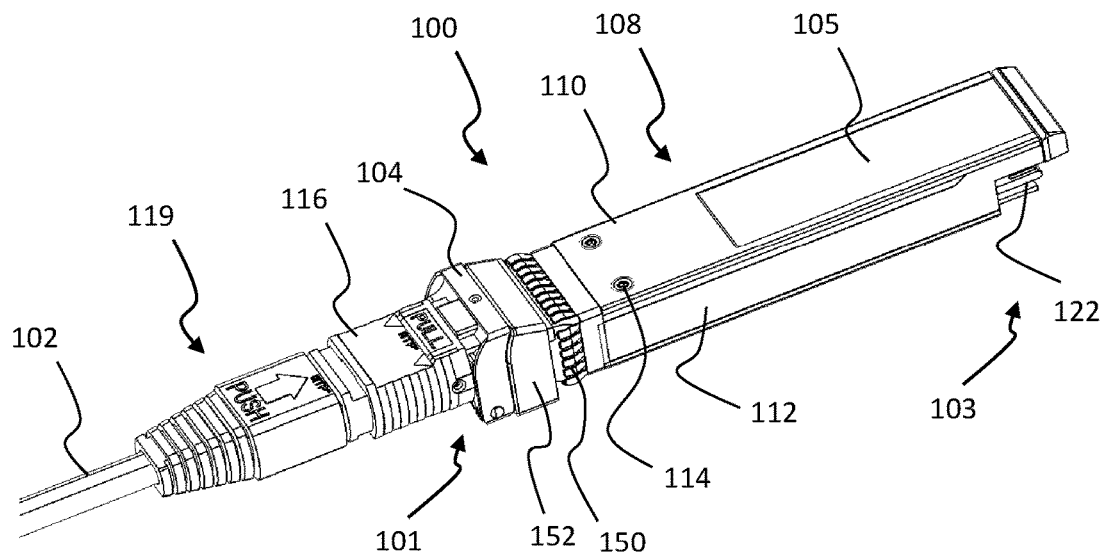
FIG. 1A is a top perspective view of an example bail-type optoelectronic module and an attached communication cable.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Embodiments disclosed herein relate to optoelectronic modules that include optical components and electronic components. More particularly, some example embodiments relate to a pluggable connector adapted as an optoelectronic module. The pluggable connector may be attached to an end of an optical cable. The pluggable connector may include coupling components that may removably secure an optoelectronic assembly to the optical cable. For example, the coupling components may optically couple one or more optical fibers of the optical cable to a mechanical transfer (MT) ferrule assembly that is attached at the other end to a lens or lens assembly of the optoelectronic assembly.

In some embodiments, an optoelectronic assembly may include a printed circuit board (PCB) and a lens block coupled to a MT ferrule assembly. The printed circuit board (PCB) may include an optical transmitting array and the lens block may be configured for coupling light from the optical transmitting array through a lens MT ferrule and the associated MT optical fibers to a connector MT ferrule, together part of the MT ferrule assembly. The connector MT ferrule is physically coupled (e.g., removably coupled so to be capable of being de-coupled) with an alignment connector to an MPO-style cable. As such, the alignment connector physically couples the connector MT ferrule with the MPO cable so that the optical fibers of the MT ferrule assembly optically couple with the optical fibers of the MPO cable. The MPO cable may have a MPO head that is configured to couple to the alignment connector of the optoelectronic module.

In some embodiments, an optoelectronic module in the form of a pluggable connector may include the optoelectronic assembly that has the printed circuit board (PCB) with the lens block coupled through the MT ferrule assembly to the alignment connector. As such, the MPO cable may not be coupled with the alignment connector. A kit may include the optoelectronic module in the form of a pluggable connector and the MPO cable.

In some embodiments, the alignment connector includes a MT ferrule receptacle and a MPO head receptacle that together are positioned to hold the connector MT ferrule and the MPO head together. The MT ferrule receptacle may be positioned at one end having a lateral opening and the MPO head receptacle can be positioned at the other end having a longitudinal opening.

In some embodiments, the alignment connector is formed into a housing of the pluggable connector having two slots that each retain a gripper arm, such that there are two separate gripper arms. The two separate gripper arms are connected only by the housing of the pluggable connector.

In some embodiments, the optoelectronic module is in the form of a bail-type pluggable connector. In other embodiments, the optoelectronic module is in the form of a pull-tab-type pluggable connector.

In some embodiments, a method may include coupling light from an optical transmitting array into a lens block subsequently to an optical fiber of a cable (e.g., MPO). The light may then be transmitted from the lens block through a ferrule assembly into an optical fiber of a cable (e.g., MPO) coupled to the optoelectronic module. The ferrule assembly can include a connector ferrule located in an alignment connector that physically connects the ferrule to the optical fiber in order to optically couple the ferrule assembly to the optical fiber of the cable.

In some embodiments, a method of fabricating an optoelectronic module in the form of a pluggable connector may include inserting an alignment connector into such a pluggable connector. Then, the connector ferrule may be coupled into the alignment connector by positioning the connector ferrule over a ferrule receptacle that is laterally oriented, and then pressing the connector ferrule down into the ferrule receptacle. Subsequently in a coupling method, the MPO head can then be longitudinally inserted into the longitudinally oriented MPO head receptacle until coupled with the connector ferrule. The gripper arms of the alignment connector can couple with features of the MPO head to facilitate the physical coupling to provide good optical coupling.

In some embodiments, a method of fabricating an optoelectronic module in the form of a pluggable connector may include forming a housing with a MPO head opening adapted to receive an MPO head such that the housing has a gripper arm slot on each side. Then, a first gripper arm is inserted down into the housing opposite of the MPO head opening, aligned with a first gripper arm slot, and then longitudinally slid into the first gripper arm slot to position the first gripper arm out of the MPO head opening. Then, a second gripper arm is inserted down into the housing opposite of the MPO head opening on the other side from the first gripper arm, aligned with a second gripper arm slot that is opposite of the first gripper arm slot, and then longitudinally slid into the second gripper arm slot to position the second gripper arm out of the MPO head opening opposite of the first gripper arm.

Reference will now be made to the drawings to describe various aspects of some embodiments. It is to be understood that the drawings are diagrammatic and schematic representations of the embodiments, and are not meant to be limiting, nor are they necessarily drawn to scale. Throughout the drawings, like numbers generally reference like structures unless described otherwise.

Figure 1B:
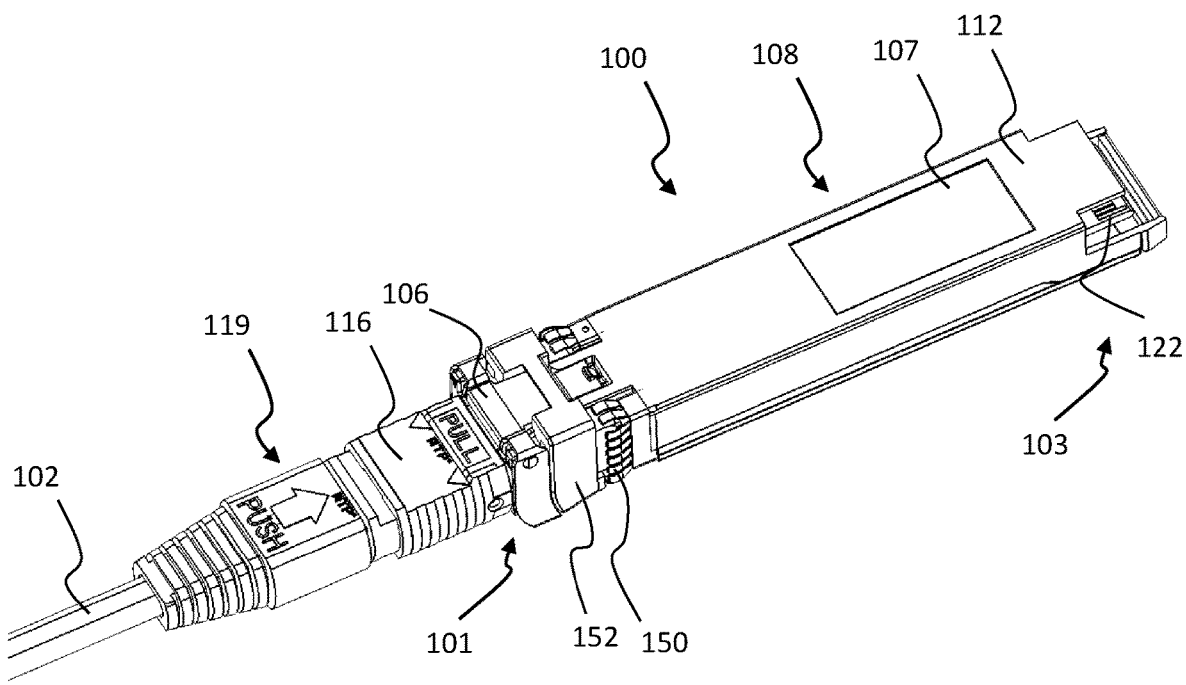
FIG. 1B is a bottom perspective view of the example bail-type optoelectronic module and the attached communication cable of FIG. 1A.

Reference is first made to FIGS. 1A and 1B, which are top and bottom perspective views of an example optoelectronic module 100 for use in transmitting and receiving optical signals in connection with one or more other devices on a network, and communicating via electrical signals with a host device. As disclosed in FIGS. 1A and 1B, the optoelectronic module 100 may be fixedly attached to a communication cable 102, and thus the optoelectronic module 100 represents one end of an "active cable" which includes another optoelectronic module (not shown) which also may be attached to the other end of the communication cable 102.

Figure 2A:
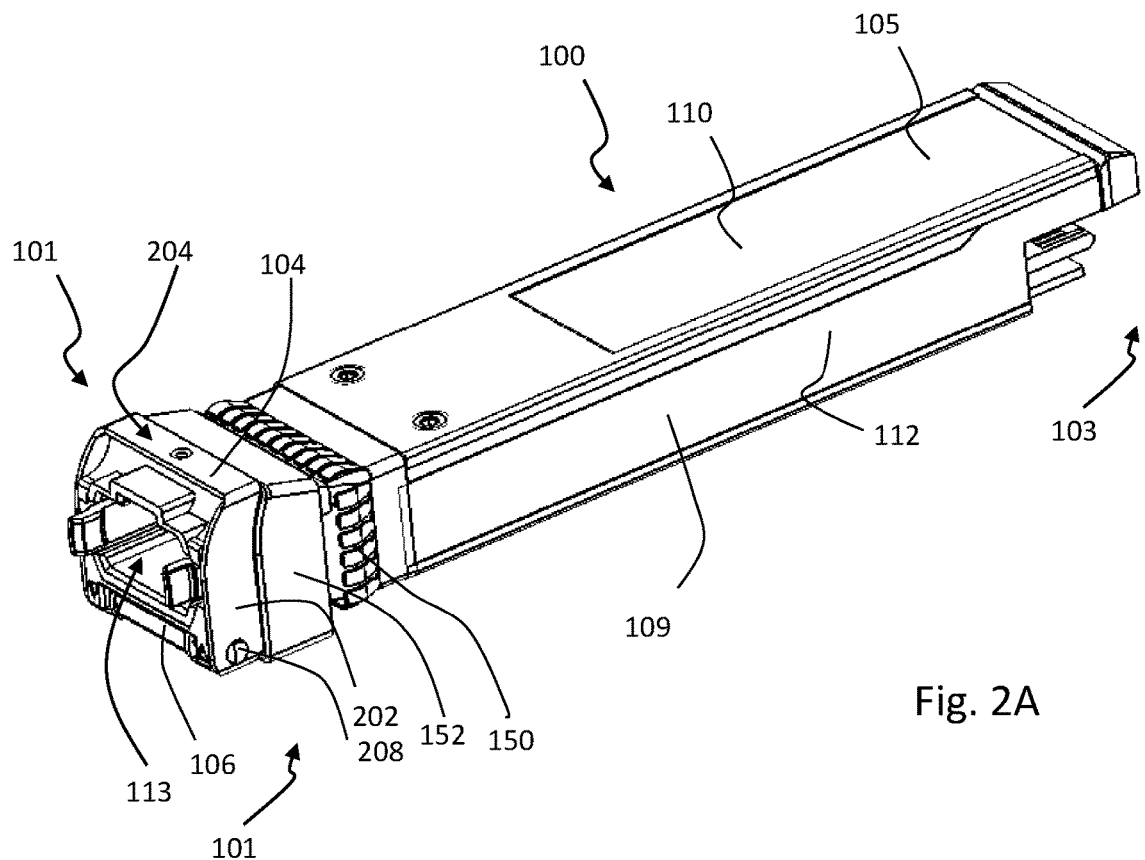
FIG. 2A is a top perspective view of an example bail-type optoelectronic module without the communication cable.
Figure 2B:
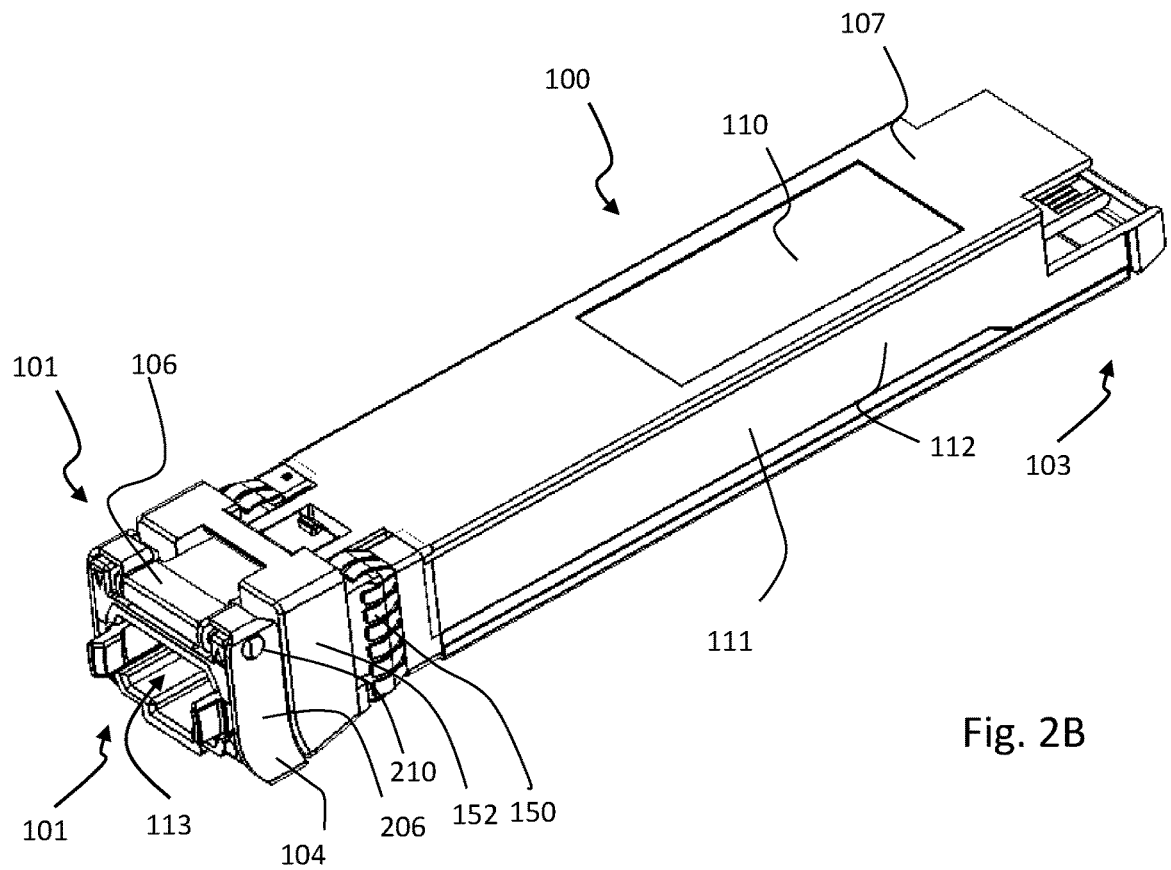
FIG. 2B is a bottom perspective view of the example bail-type optoelectronic module of FIG. 2A without the communication cable.

It is understood, however, that the communication cable 102 could instead be detachably connected to the optoelectronic module 100, in which case the optoelectronic module 100 would function as a stand-alone module as shown in FIGS. 2A-2B. For example, where the communication cable 102 is a fiber-optic ribbon cable, the communication cable 102 may be terminated on one or both ends with a MPO-style female connector (e.g., MPO head) and the optoelectronic module 100 may include a corresponding MPO-style male connector (e.g., connector ferrule) configured to pluggably receive the MPO-style female connector.

In some embodiments, the communication cable 102 may be a multichannel fiber-optic communication cable that includes twelve (12) fibers, four (4) of which may be employed to transfer data signals in one direction, four (4) of which may be employed to transfer data signals in the opposite direction, and four (4) of which may not currently be in use but are available for future use.

The optoelectronic module 100 may be configured for optical signal transmission and reception at a variety of per-second data rates including, but not limited to, 40 Gbit or higher. Further, the optoelectronic module 100 may be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, 1610 nm, or longer wavelengths. Also, the optoelectronic module 100 may be configured to support various communication protocols including, but not limited to, INFINIBAND; Fast Ethernet; Gigabit Ethernet; 10 Gigabit Ethernet; 1×, 2×, 4×, 8×, and 10× Fibre Channel; and SONET OC-3, OC-12, OC-48, OC-192, and OC-768. Further, the optoelectronic module 100 may be configured to operate at various temperature ranges including, but not limited to, 0° C. to 70° C. and −40° C. to 85° C. In addition, although the example optoelectronic module 100 may be configured to be substantially compliant with the SFP+ MSA, the optoelectronic module 100 may instead be configured to assume a variety of different form factors that are substantially compliant with various transceiver and/or transponder MSAs including, but not limited to, SFF, SFP, SFP-DD, QSFP, QSFP-DD, OSFP, XFP, XPAK, X2, XENPAK, or CXP. For example, the optoelectronic module 100 may be usable with a 4-channel QSFP+transceiver or a 12-channel CXP transceiver, in a space similar to the size of a SFP+ transceiver. The front panel space of a standard 19-inch rack is fixed. To increase the optical port density or link density, more optical transceiver modules have to fit in that fixed front panel space. The optoelectronic modules described herein provide a solution for increasing the port density by replacing a SFP+module with a QSFP+module (e.g., for 4× more density) or with a CXP module (e.g., for 12× more density) with the same front panel footprint of a SFP+module.

The optoelectronic module 100 may include a bail 104 operably connected to a pivot latch 106 that can collectively be employed to insert the optoelectronic module 100 into a cage of a host device (not shown) and to extract the optoelectronic module 100 from the cage. The bail 104 and/or pivot latch 106 may be made from rubber, plastic, sheet metal, aluminum, zinc, stainless steel, or the like. The optoelectronic module 100 further includes a housing 108 that generally includes a top shell 110 and a bottom shell 112. The top and bottom shells 110 and 112 may be formed from zinc with a copper-nickel coating, for example. The top and bottom shells 110 and 112 of the optoelectronic module 100 are configured to be held together with at least one fastener 114.

Figure 1C:
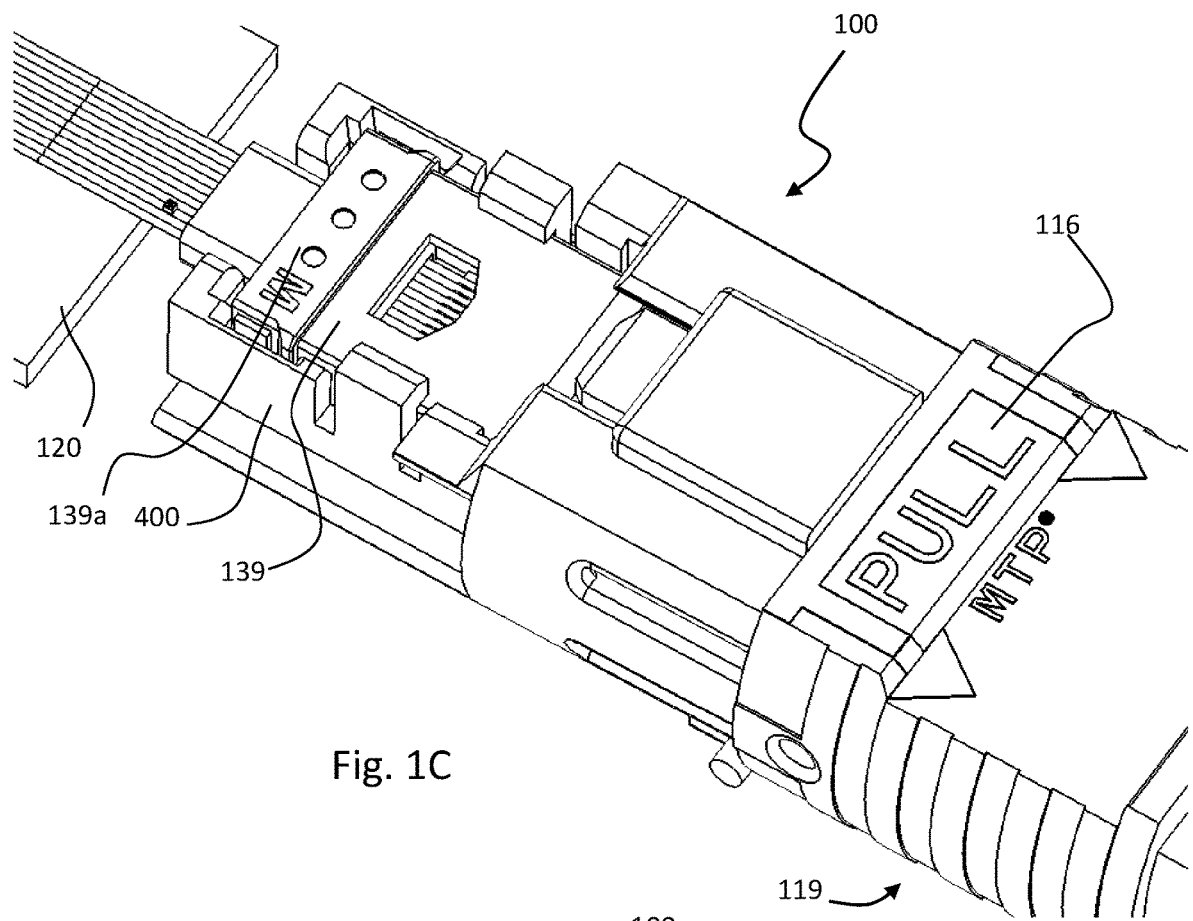
FIG. 1C is an angled top perspective view of the internal components of the example bail-type optoelectronic module and the attached communication cable of FIG. 1A.
Figure 1D:
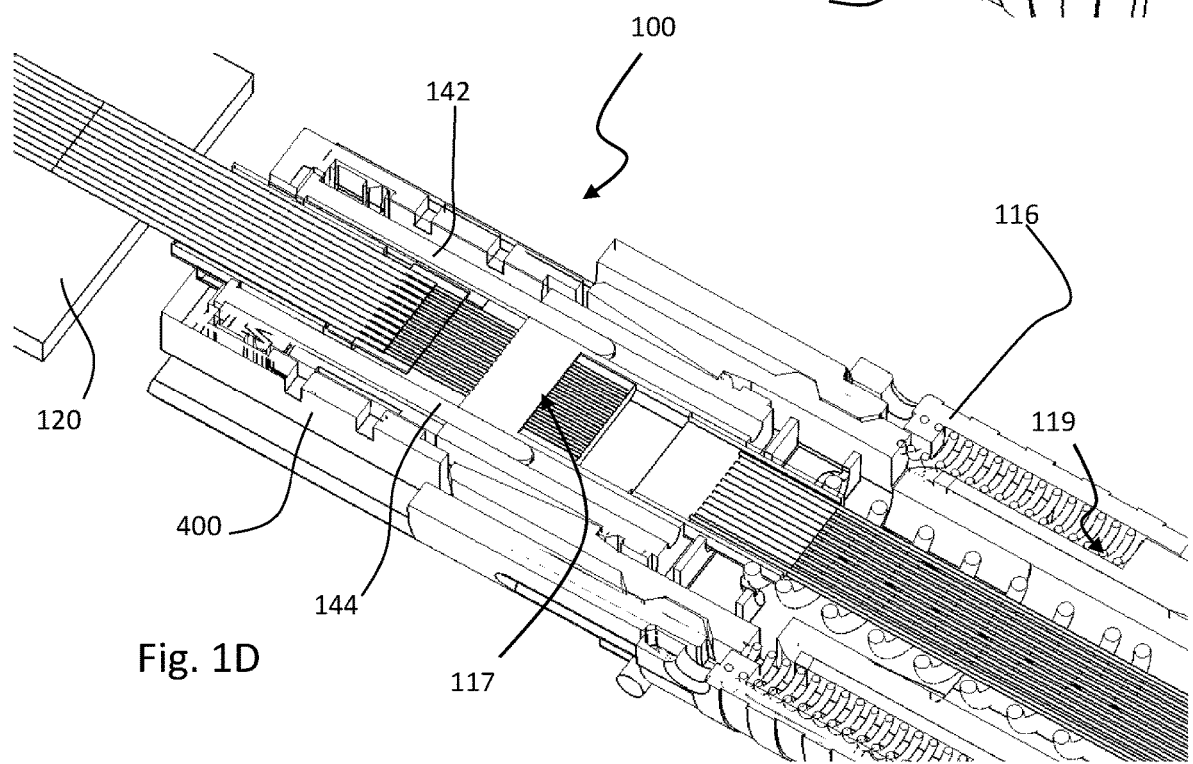
FIG. 1D is an angled top perspective cross-sectional view of the internal components of the example bail-type optoelectronic module and the attached communication cable of FIG. 1A.

FIGS. 1C and 1D show the MPO-style plug 116 with a female MT-style ferrule 117 (shown in cross-section in FIG. 1D) attached to the communication cable 102. The MPO-style plug 116 may be configured to be received within an alignment connector 400, which can function as an alignment guide and a physical coupler. The alignment connector 400 is disposed within a connector end opening 113 of the bottom shell 112 as shown in FIGS. 2A and 2B. The MPO-style plug 116 and the communication cable 102 along with standard components collectively form a cable assembly 119.

Figure 2C:
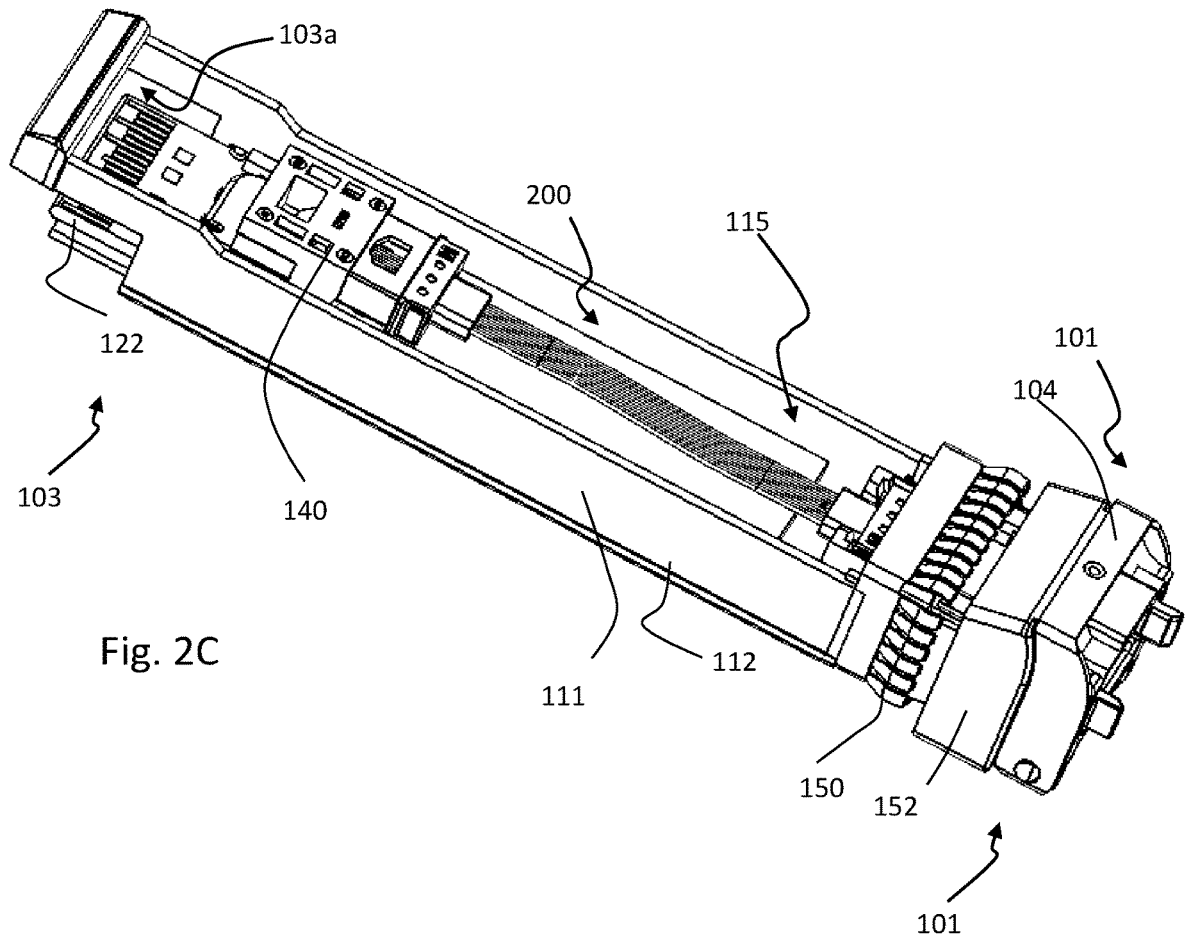
FIG. 2C is a top perspective view of the internal components of the example bail-type optoelectronic module of FIG. 2A.
Figure 2D:
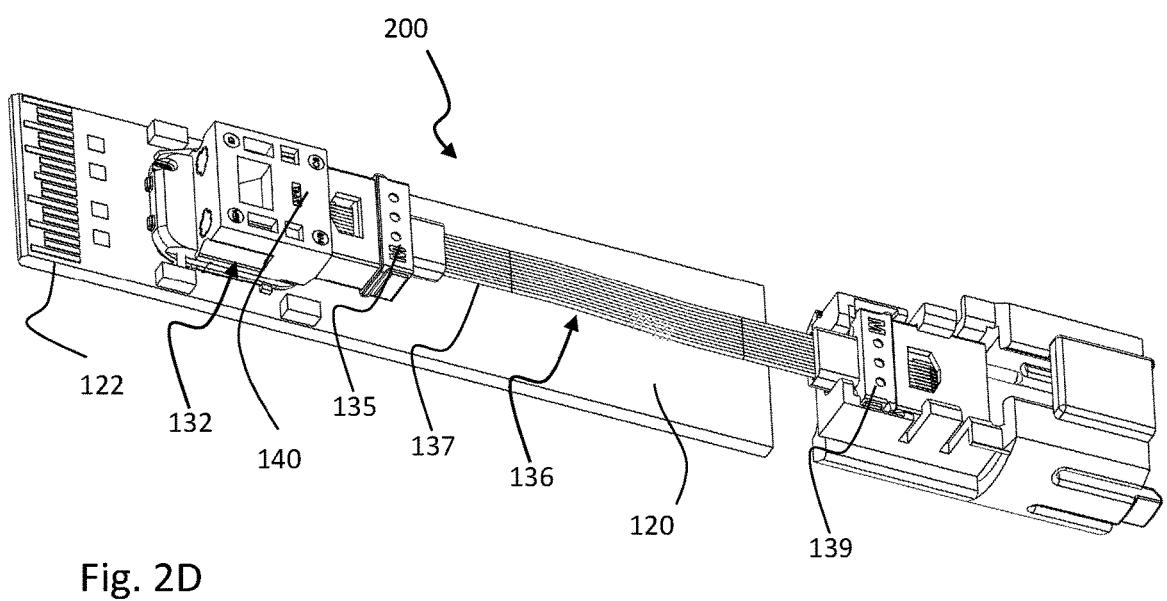
FIG. 2D is a top perspective view of the internal components of the example bail-type optoelectronic module of FIG. 2A showing the MT ferrule in the MT ferrule receptacle alignment connector receptacle.

The top and bottom shells 110 and 112 also generally surround a PCB 120 having an exposed edge connector 122, a lens block 140, a transmitter array 132 (e.g., a vertical-cavity surface-emitting laser (VCSEL)) located under the lens block 140, and a MT ferrule assembly 136 as shown in FIGS. 2C and 2D. The MT ferrule assembly 136 includes a lens MT ferrule 135 connected to MT ferrule optical fibers 137 that in turn are connected to the connector MT ferrule 139. The PCB 120 with the attached lens block 140, the MT ferrule assembly 136, and the alignment connector 400 may be coupled to the bottom shell 112 with the alignment connector 400 at the connector end opening 113.

In operation, outgoing electrical data signals travel via the edge connector 122 from the host device (not shown) into the optoelectronic module 100 including the PCB 120. Transmitter circuitry (not shown) on the PCB 120 refines these electrical data signals before passing them along conductive traces (not shown) to the transmitters of the transmitter array 132. The transmitters of the transmitter array 132 convert these electrical data signals into optical data signals before transmitting them through the lens block 140, the MT ferrule assembly 136 having the connector MT ferrule 139 in an alignment connector 400, and into the modified MPO-style plug 116, and then into the fiber-optic communication cable 102. In this manner, the host device (not shown) into which the optoelectronic module 100 may be positioned, can communicate with a remote host device (not shown).

The transmitter array 132 may be an array of optical transmitters such as vertical-cavity surface-emitting lasers (VCSELs), or the like. For example, the transmitter array 132 may be a four (4) channel VCSEL array. In some embodiments, both a transmitter array 132 and a receiver array (not shown) may be included in the optoelectronic module 100, such that the optoelectronic module 100 may become both an optical transmitter and receiver. Alternately or additionally, the optoelectronic module 100 may include only a single transmitter rather than a transmitter array 132.

The various embodiments described herein include a system and method for directly coupling light from laser devices into fibers and from fibers onto photo diodes without use of a fiber patch cord or a flex circuit. The system and method extends the MT ferrule from the lens block 140 to the front 101 of the optoelectronic module 100 where the MPO-style plug 116 may be received into the connector end opening 113, which is opposite of the back 103 of the optoelectronic module 100. Correspondingly, the optoelectronic module 100 includes a top 105 and a bottom 107 along with a right side 109 and a left side 111 as shown in FIG. 2A. The housing 108 includes an interior cavity 115 with a connector end opening 113 at the front 101.

Figure 3A:
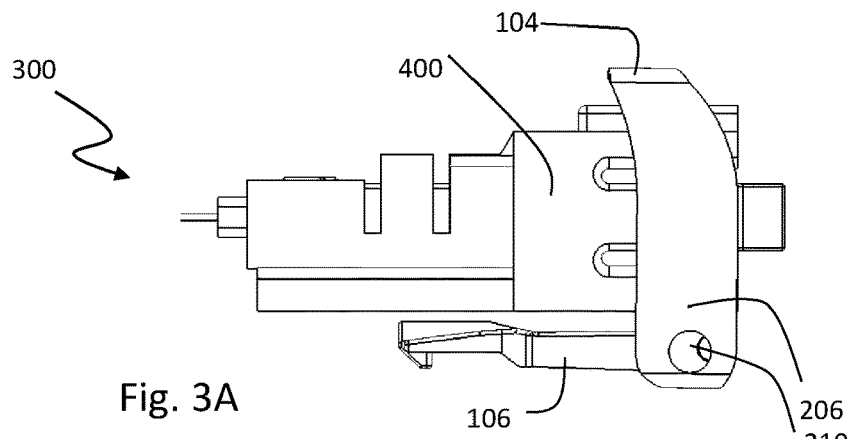
FIG. 3A is a side view of an example alignment connector receptacle with a MT ferrule in a MT ferrule receptacle of a bail-type optoelectronic module.
Figure 3B:
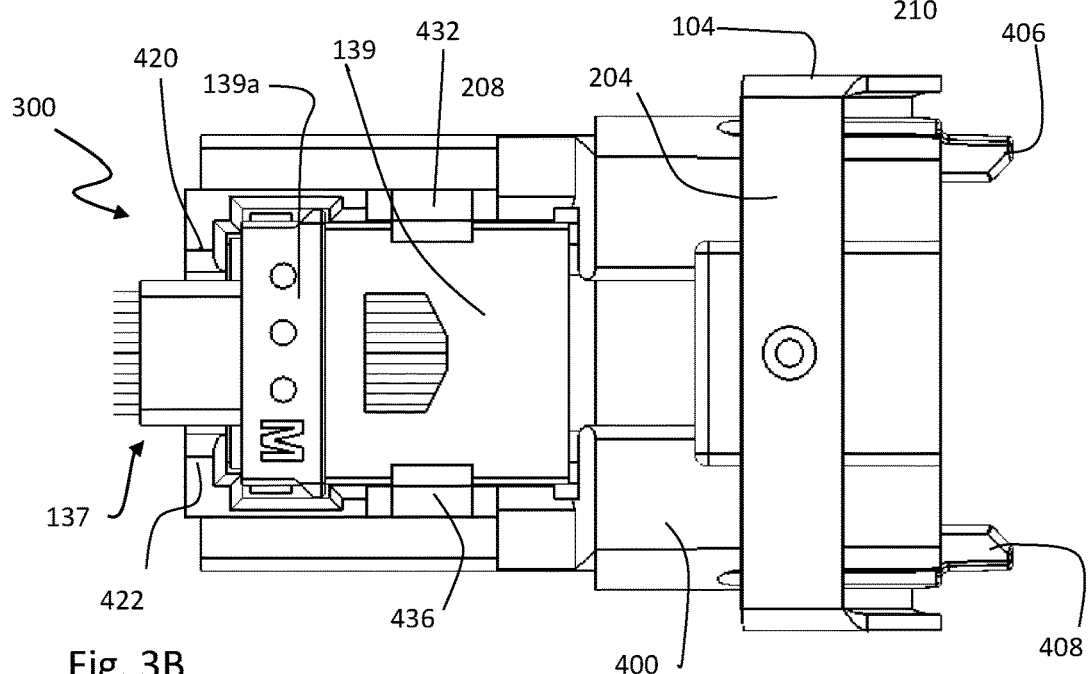
FIG. 3B is a top view of the example alignment connector receptacle of FIG. 3A.
Figure 3C:
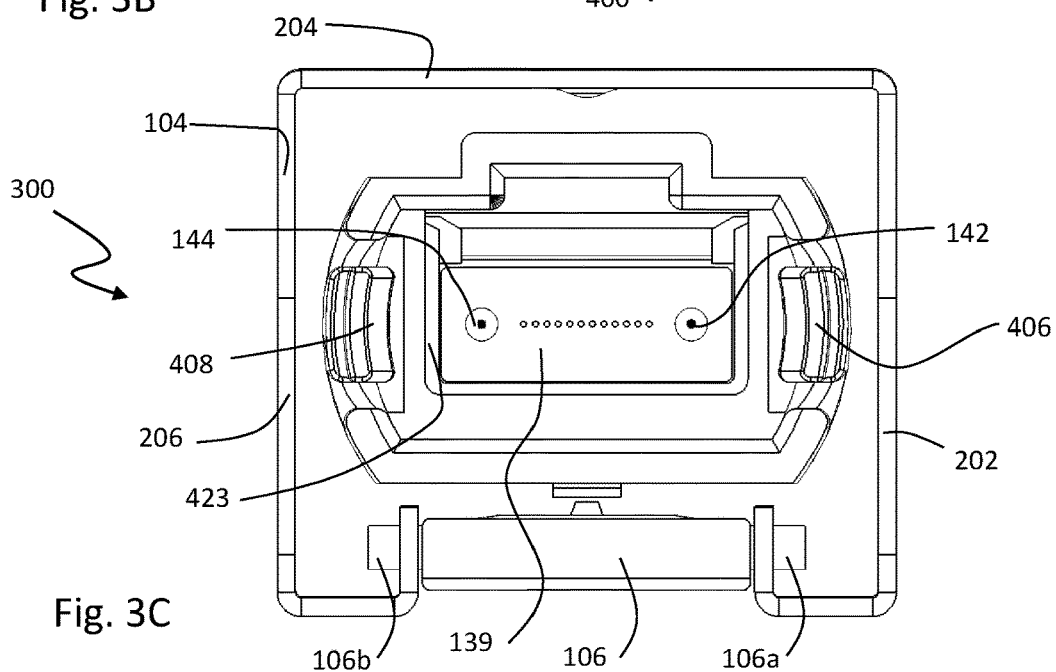
FIG. 3C is an end view of the example alignment connector receptacle of FIG. 3A.

FIGS. 2A-2B show the optoelectronic module 100 without the cable 102 connected thereto. FIGS. 2C-2D show internal components of the optoelectronic module 100. FIGS. 3A-3C show the alignment connector 400 having the connector ferrule 139 therein.

FIGS. 4A-4F show the alignment connector 400 that can be used in the optoelectronic modules of FIGS. 1A-1D, 2A-2D, and 5A-5E. Now, the alignment connector 400 is described in detail. The alignment connector 400 includes a unitary alignment connector body 402 that includes the features as illustrated. The alignment connector 400 includes a front end 404 having a first gripper arm 406 on a first side 407 and a second gripper 408 arm on a second side 409 with an alignment connector aperture 410 between the first gripper arm 406 and the second gripper arm 408. The alignment connector 400 includes a base 412 extending from the front end 404 to a back end 414 and from the first side 407 to the second side 409. The base 412 can have a bottom surface 416 and a receptacle surface 418 extending from the front end 404 to the back end 414. The back end 414 can have a first back wall 420 and a second back wall 422 with a back gap 424 therebetween. The alignment connector 400 can include a ferrule receptacle 426 extending from the first back wall 420 and the second back wall 422 to a medial region 428 where the alignment connector aperture 410 extends from. The alignment connector aperture 410 can include a portion of the receptacle surface 418. The ferrule receptacle 426 can be defined by a first side wall 430 having a first latch arm 432 and a second side wall 434 having a second latch arm 436.

Figure 4A:
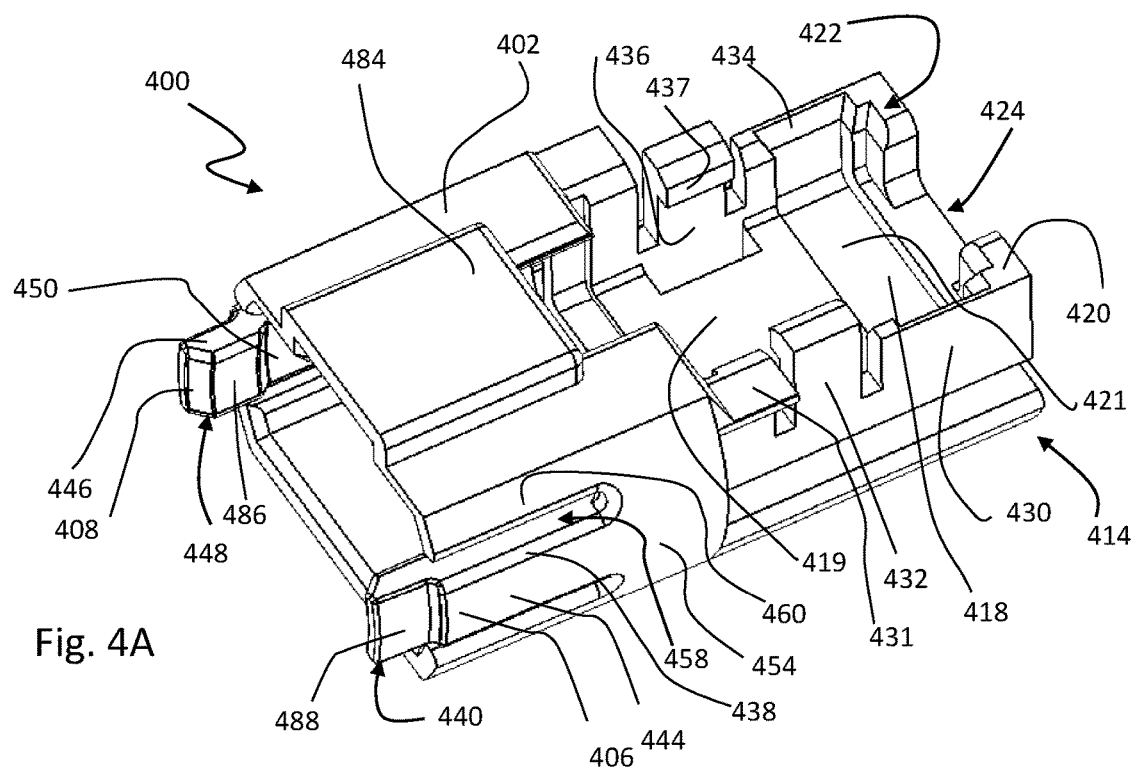
FIG. 4A is a top perspective view of an example alignment connector receptacle with a MT ferrule in a MT ferrule receptacle of the alignment connector receptacle.
Figure 4B:
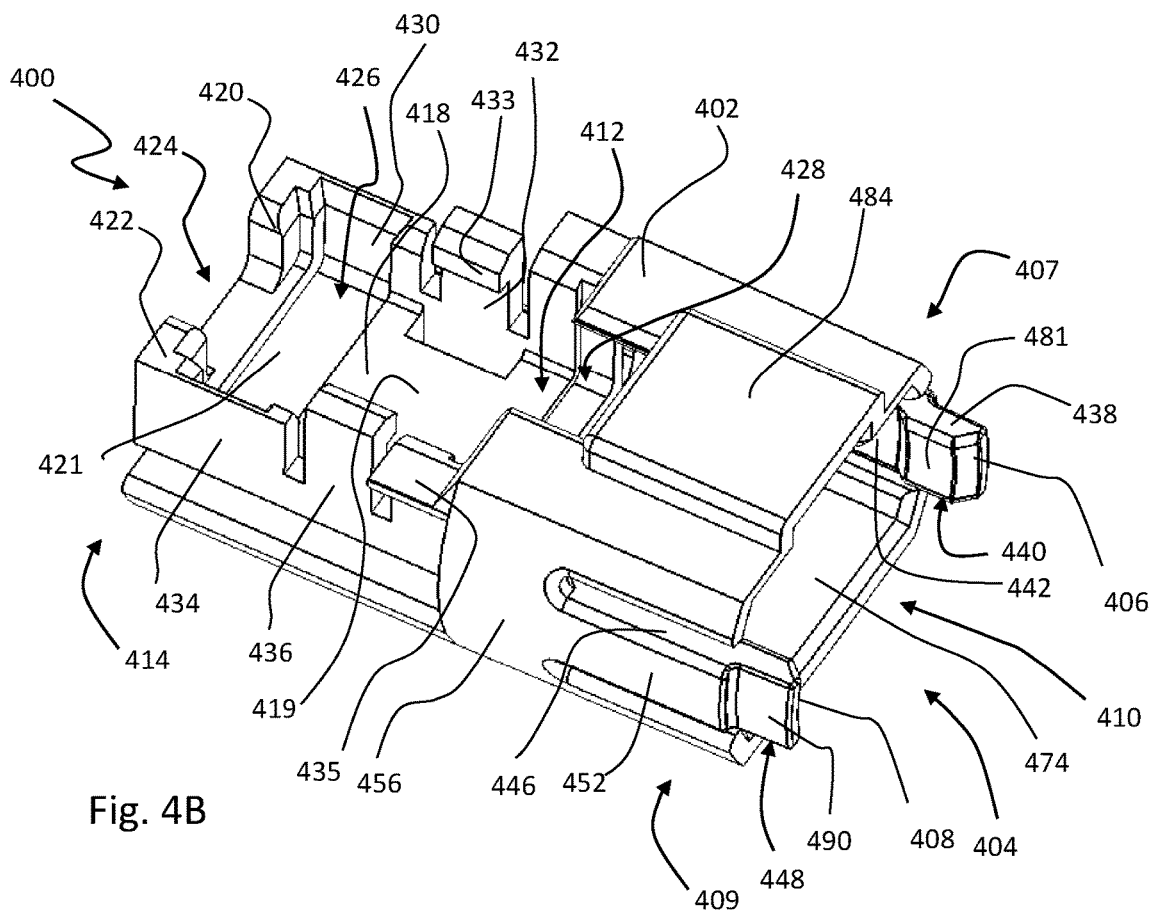
FIG. 4B is a top perspective view of an example alignment connector receptacle with an empty MT ferrule receptacle.
Figure 4C:
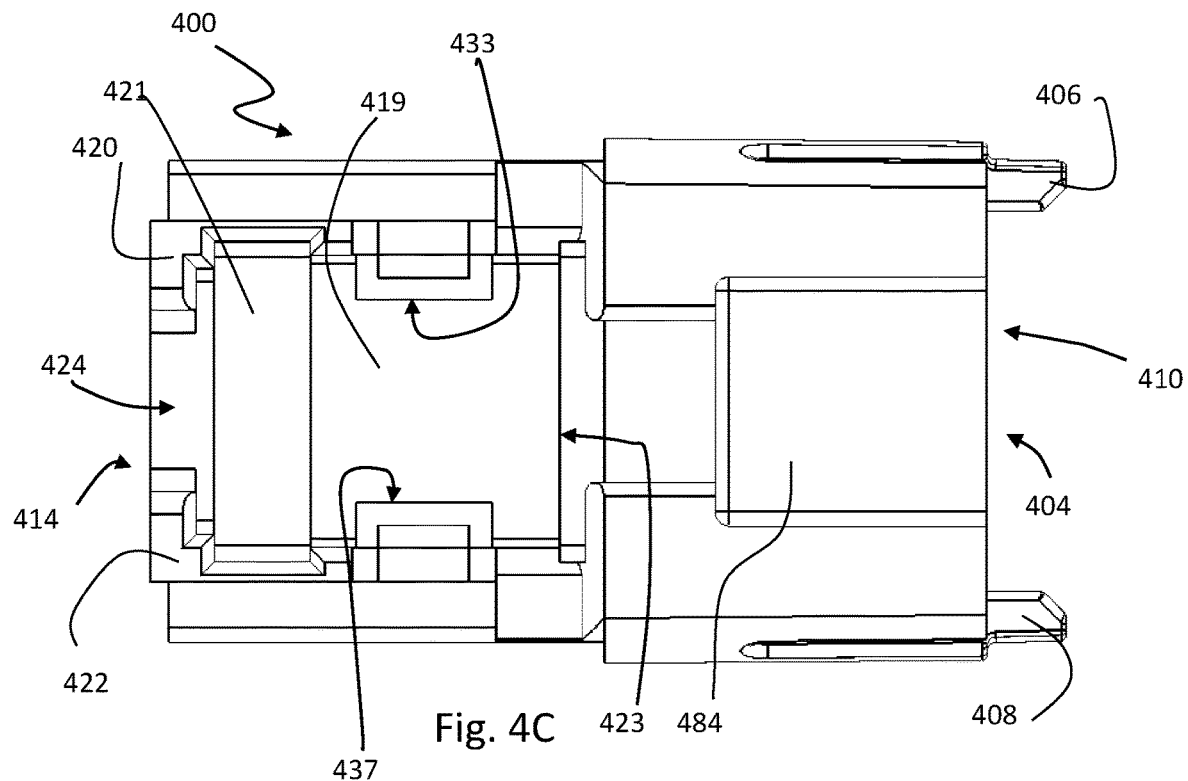
FIG. 4C is a top view of an example alignment connector receptacle with an empty MT ferrule receptacle.
Figure 4D:
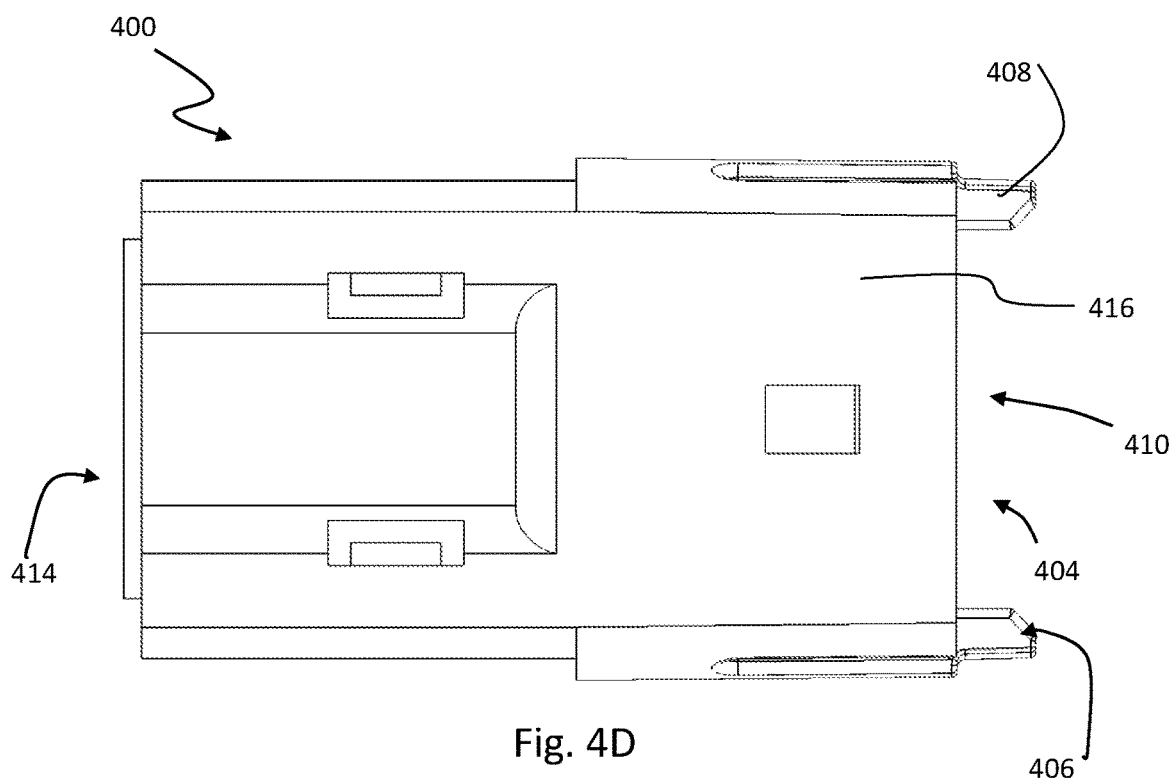
FIG. 4D is a bottom view of an example alignment connector receptacle with an empty MT ferrule receptacle.
Figure 4E:
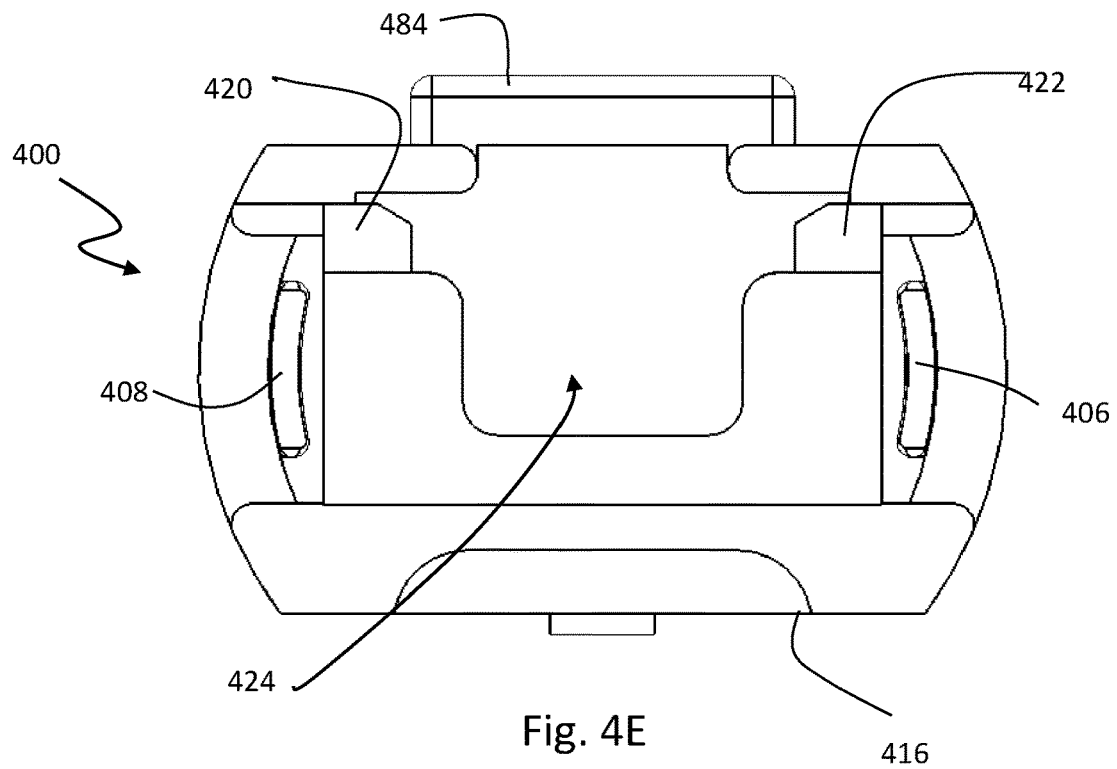
FIG. 4E is a back end view of an example alignment connector receptacle with an empty MT ferrule receptacle.

Referring to FIG. 4A-4B. The first gripper arm 406 and the second gripper arm 408 of the alignment connector 400 are each laterally flexible relative to a longitudinal axis that extends from the front end 404 to the back end 414. The first gripper arm 406 has a top surface 438 and an opposite bottom surface 440 with an internal surface 442 and an external surface 444. The second gripper arm 408 has a top surface 446 and an opposite bottom surface 448 with an internal surface 450 and an external surface 452. The first gripper arm 406 extends from a first side region 454 of the body 402. The second gripper arm 408 extends from a second side region 456 of the body 402.

Figure 4F:
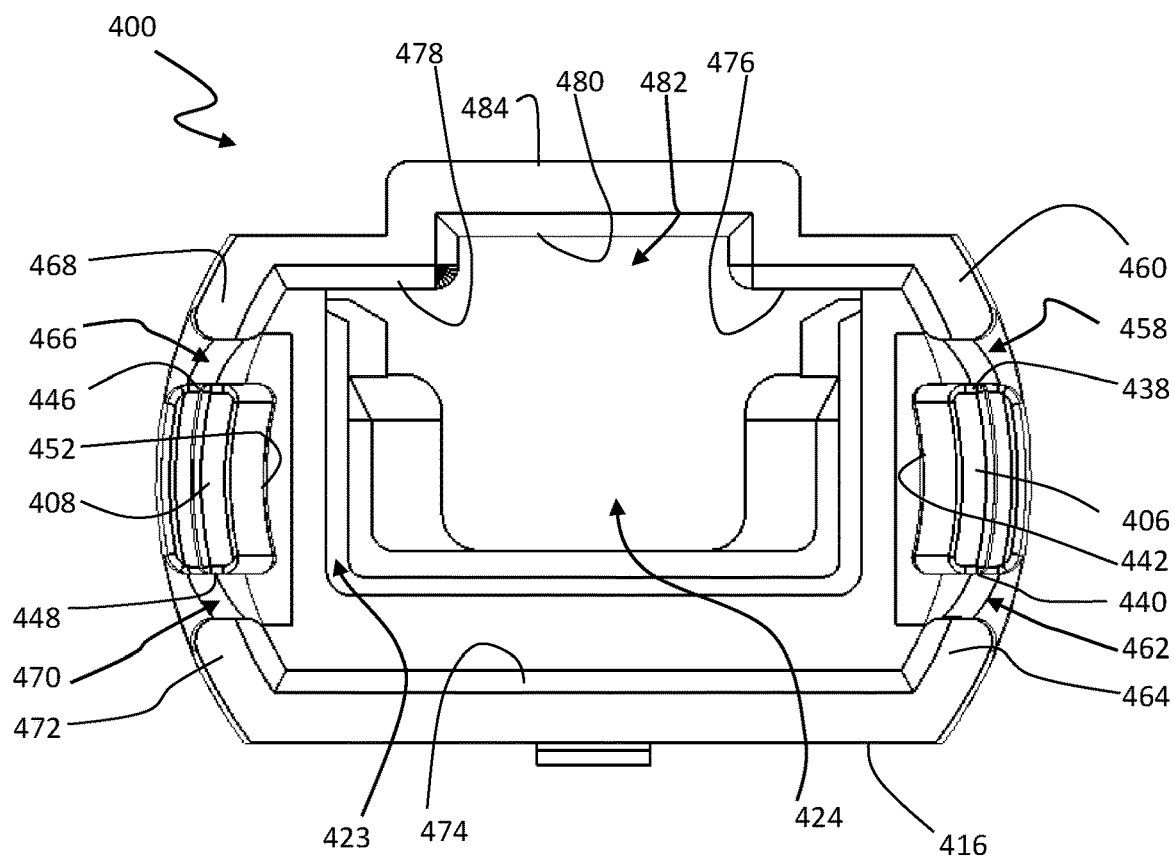
FIG. 4F is a back end view of an example alignment connector receptacle with an empty MT ferrule receptacle.

Referring to FIG. 4F. The top surface 438 of the first gripper arm 406 is exposed to a first top gap 458 between the first gripper arm 406 and a first top portion 460 of the body 402. The bottom surface 440 of the first gripper arm 406 is exposed to a first bottom gap 462 between the first gripper arm 406 and a first bottom portion 464 of the body 402. This allows the first gripper arm 406 to be laterally flexible. The top surface 446 of the second gripper arm 408 is exposed to a second top gap 466 between the second gripper arm 408 and a second top portion 468 of the body 402. The bottom surface 448 of the second gripper arm 408 is exposed to a second bottom gap 470 between the second gripper arm 408 and a second bottom portion 472 of the body 402. This allows the second gripper arm 408 to be laterally flexible.

The alignment connector 400 includes an alignment connector aperture 410 that is defined by: a bottom aperture surface 474 at a bottom; the first gripper arm 406, the first top portion 460, and the first bottom portion 464 on the first side 407; the second gripper arm 408, the second top portion 468, and the second bottom portion 472 on the second side 409, and a first top aperture surface 476, a second top aperture surface 478, and a top aperture recess surface 480 of a top aperture recess 482 at a top. The alignment connector aperture 410 can be viewed in the FIGS. 4C-4F. As shown, the top aperture recess 482 is defined by a raised top portion 484; however, the top may be level without a raised portion. The raised top portion 484 may be adapted to accept certain cable heads, such as those of the MPO style cable.

The first gripper arm 406 of the alignment connector 400 can include a first inner protrusion 481 on a first internal surface 442 at an end opposite from the first side region 454 of the body 402. The second gripper arm 408 of the alignment connector 400 can include a second inner protrusion 486 on the second internal surface 450 at an end opposite from the second side region 456 of the body 402. The first gripper arm 406 can include a first indent 488 on the first external surface 444 opposite of the first inner protrusion 481. Also, the second gripper arm 408 can include a second indent 490 on the second external surface 452 opposite of the second inner protrusion 486.

As noted, the alignment connector 400 includes the ferrule receptacle 426. The ferrule receptacle 426 can include a first latch arm 432, which can have a first latch protrusion 433 extending inwardly at an angle from an inner surface of the first latch arm 432. The alignment connector 400 can include a second latch arm 436, which can have a second latch protrusion 437 extending inwardly at an angle from an inner surface of the second latch arm 436. As shown, the first latch protrusion 433 and second latch protrusion 437 are generally pointing at each other. In one aspect, the angle of the first latch protrusion 433 is substantially orthogonal. In another aspect, the angle of the second latch protrusion 437 is substantially orthogonal.

Regarding the ferrule receptacle 426, the first side wall 430 can include a first wing 431 extending outwardly at an angle from an outer surface of the first side wall 430. Also, the second side wall 434 of the ferrule receptacle 426 can include a second wing 435 extending outwardly at an angle from an outer surface of the second side wall 434. In one aspect, the angle of the first wing 431 is substantially orthogonal. In another aspect, the angle of the second wing 435 is substantially orthogonal.

The receptacle surface 418 of the ferrule receptacle 426 can include various features. As shown, the receptacle surface 418 can include a ferrule body surface 419 between the first latch arm 432 and second latch arm 436. Also, the receptacle surface 418 can include a ferrule bracket recess 421 between the ferrule body surface 419 and both the first back wall 420 and the second back wall 422.

The body 402 of the alignment connector 400 can include a stop lip 432 between the ferrule body surface 419 and the alignment connector aperture 410. The stop lip 432 can provide a stop between the connector ferule 139 and the cable head that is inserted into the alignment connector 400. The stop lip 432 can be laterally oriented relative to the longitudinally oriented ferrule body surface 419 and the bottom aperture surface 474 thereby functioning to stop longitudinal movement of a plug located in the alignment connector aperture 410. For example, as shown, the stop lip 432 can be U-shaped.

Reference is now made to FIGS. 1A-1D and 2A-2D showing the optoelectronic module 100, and FIGS. 5A-5E showing the optoelectronic module 500, both of which include the alignment connector 400. The difference is that the optoelectronic module 100 includes a bail 104 and the optoelectronic module 500 includes a pull-tab 502. Otherwise, the components of one embodiment can be used for the other embodiment, and vice versa.

An optoelectronic module 100 or 500 can include a housing 108 having an interior cavity 115 with a connector end opening 113 at a front end 101. The alignment connector 400 is shown to be at least partially located in the interior cavity 115 and extending through and out of the connector end opening 113. The alignment connector 400 includes a unitary alignment connector body 402 that has the features described herein. The alignment connector 400 can include a front end 404 having a first gripper arm 406 on a first side 407 and a second gripper 408 arm on a second side 409. The alignment connector 400 can include an alignment connector aperture 410 between the first gripper arm 406 and the second gripper arm 408. The alignment connector 400 can include a base 412 extending from the front end 404 to the back end 414 and from the first side 407 to the second side 409. The base 412 of the alignment connector 400 can include a bottom surface 416 and a receptacle surface 418 extending from the front end 404 to the back end 414. The back end 414 of the alignment connector 400 can include a first back wall 420 and a second back wall 422 with a back gap 424 therebetween. The alignment connector can include a ferrule receptacle 426 extending from the first back wall 420 and the second back wall 422 to a medial region 428. The alignment connector aperture 410 extends from the front end 404 to the medial region 428. The alignment connector aperture 410 also includes a portion of the receptacle surface 418. The ferrule receptacle 426 is at least partially defined by a first side wall 430 having a first latch arm 432 and a second side wall 434 having a second latch arm 436.

The optoelectronic module 100 or 500 can include one or more internal components 200, which are illustrated in FIGS. 2A-2D. The internal components of the optoelectronic module 100 or 500 can include a ferrule assembly 136 having a connector ferrule 139 (e.g., connector MT ferrule) located in the ferrule receptacle 426 (see FIG. 3A-3C), wherein the connector ferrule 139 in the alignment connector 400 is designated as number 300. As shown, the first latch arm 432 and the second latch arm 436 of the alignment connector 400 cooperate to retain the connector ferrule 139 in the ferrule receptacle 426. The first latch protrusion 433 of the first latch arm 432 and the second latch protrusion 437 of the second latch arm 436 cooperate to hold a top surface of the connector ferrule 139. The ferrule body surface 419 interfaces with a bottom surface of the connector ferrule 139 and the ferrule bracket recess 421 interfaces with a bracket 139a of the connector ferrule 139. A ferrule optical fiber 137 of the ferrule assembly 136 is connected at an end to the connector ferrule 139 and the ferrule optical fiber 137 extends through the back gap 424 between the first back wall 420 and the second back wall 422.

The ferrule optical fiber 137 is connected at an end to a lens ferrule 135 of the ferrule assembly 136, and the lens ferrule 135 is optically coupled with a transmitter array 132 of a PCB 120, as shown in FIGS. 2C-2D.

As shown, the optoelectronic module 100 can include a bail 104 at the front end 101 of the housing 108. The bail 104 includes a first arm 202 connected to a first end of a cross arm 204 and a second arm 206 connected to a second end of the cross arm 204. The first arm 202 includes a first latch aperture 208 opposite of the first end of the cross arm 204 and the second arm 206 includes a second latch aperture 210 opposite of the second end of the cross arm 204. A pivot latch 106 is operably coupled with the bail 104 to allow for rotation of the bail 104 relative to the alignment connector aperture 410. The pivot latch 106 is coupled to the housing 108 so as to rotatably couple the bail 104 to the housing 108. The pivot latch 106 includes a first axel 106a in the first latch aperture 208 and a second axel 106b in the second latch aperture 210.

The housing 108 of any embodiment can have a top shell 110 coupled with a bottom shell 112. Also, an EMF collar 150 can be included on any embodiment, such as around the housing 108 near a housing head 152. As shown, the bail 104 can be in a retracted position, which is adjacent to the housing head 152 opposite of the EMF collar 150. Also, any embodiment can include an edge connector 122 of the PCB 120 extending through a back aperture 103a of the back 103 of the housing 108.

FIGS. 5A-5E show that the optoelectronic module 500 can include a pull-tab 502 at the front end 101 of the housing 108. The optoelectronic module 500 may also include the alignment connector 400. The pull-tab 502 is oriented along a longitudinal axis of the housing along with the first gripper arm 406 and the second gripper arm 408. The pull-tab 502 can include mounting components 504 mounted to a bottom 107 of the housing 508. Such mounting components 504 may be standard mounting components to mount a pull-tab 502 to a housing 108 of an optoelectronic module 500. The pull-tab 502 can be mounted to a bottom shell 112 of the housing 108. As shown, the pull-tab 502 includes an elongate region 506 and an end region 508. Also, the end region of the pull-tab 502 includes a tab aperture 510.

Figures 5A, 5B, 5C:
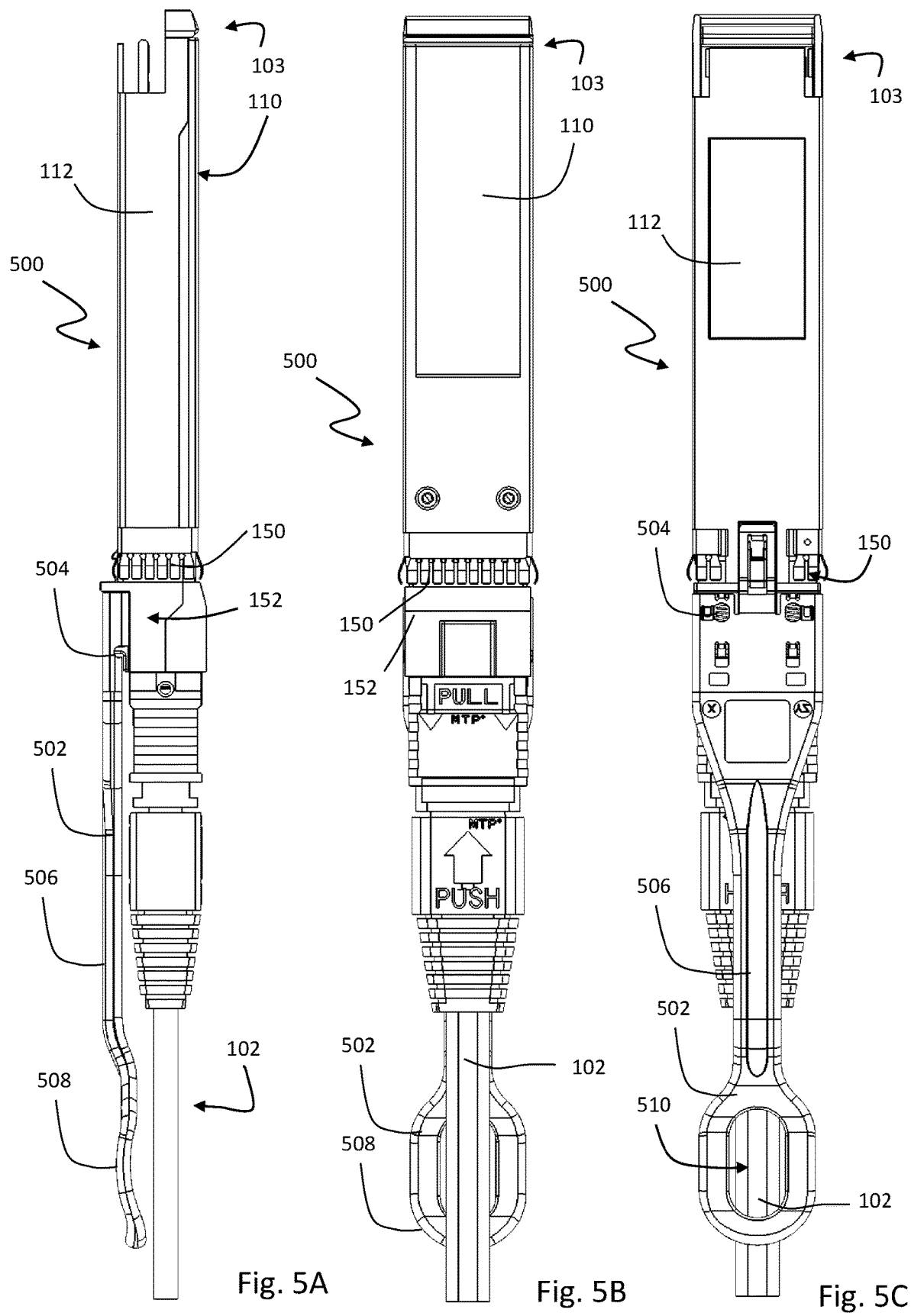
FIG. 5A is a side view of an example tab-type optoelectronic module and an attached communication cable.
FIG. 5B is a top view of the example tab-type optoelectronic module and the attached communication cable of FIG. 5A.
FIG. 5C is a bottom perspective view of the example tab-type optoelectronic module and the attached communication cable of FIG. 5A.
Figure 5D:
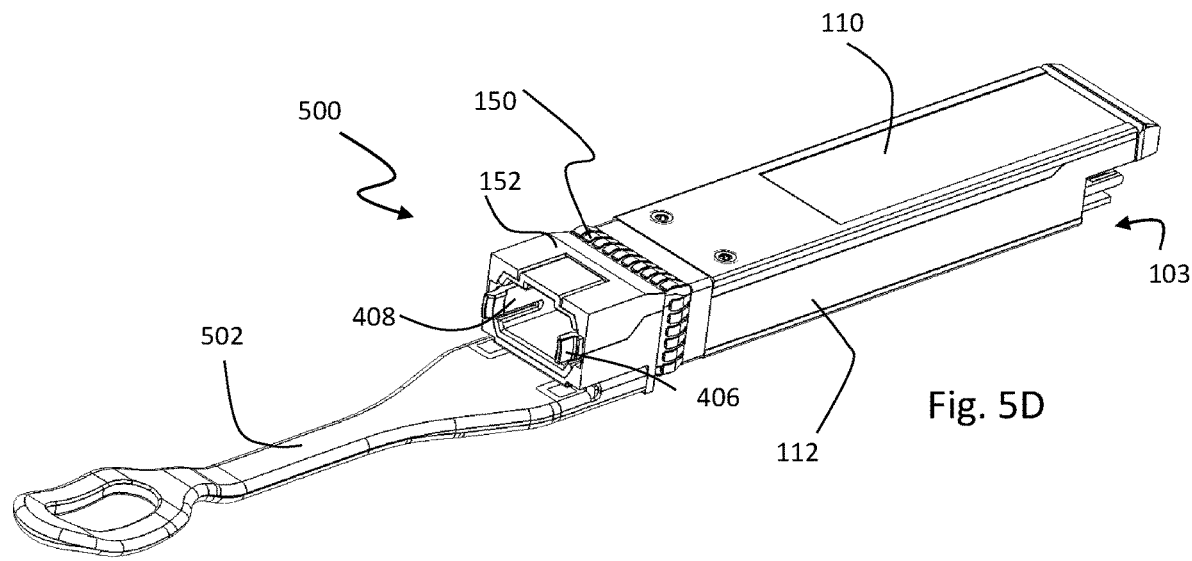
FIG. 5D is a top perspective view of the example tab-type optoelectronic module of FIG. 5A without an attached communication cable.
Figure 5E:
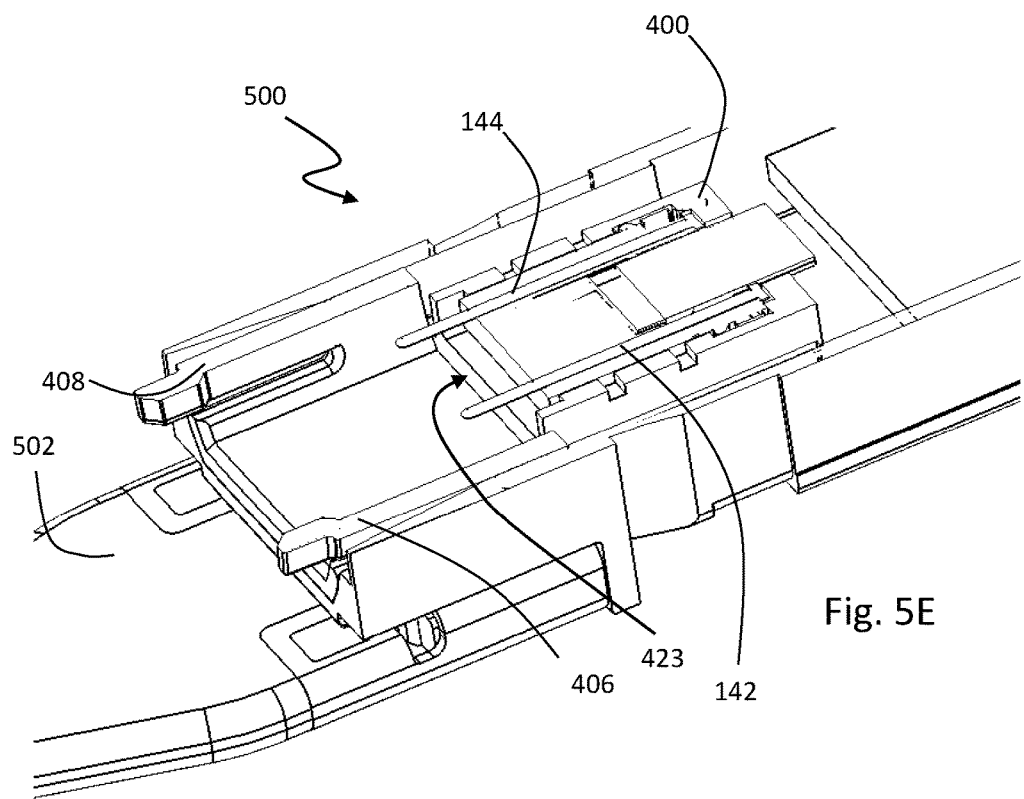
FIG. 5E is a top perspective cross-sectional view of a portion of the example tab-type optoelectronic module of FIG. 5A showing the internal components.

Additionally, in order to improve alignment, the connector ferrule 139 may include a first guide pin 142 and a second guide pin 144 as shown in FIGS. 1D and 5E. The first guide pin 142 and the second guide pin 144 can extend out of the connector ferrule 139 for guiding alignment of a connector head (e.g., 116) therewith.

Additionally, embodiments of optoelectronic modules 600 or 700 shown in FIGS. 6A-6L and 7A-7E may have two separate gripper arms 606 and 608 that are not connected other than through the housing 108. As such, the housing 108 couples with the two separate gripper arms 606 and 608. The optoelectronic modules 600 or 700 can include a housing 108 having an interior cavity 115 with a connector end opening 113 at a front end 101. A first gripper slot 602 can be formed into the housing 108 and can extend from the connector end opening into the interior cavity 115. A first gripper arm 606 can be located in the first gripper slot 602 so as to extend out of the connector end opening 113. A second gripper slot 604 can be formed into the housing 108 and can extend from the connector end opening 113 into the interior cavity 115. A second gripper arm 608 can be located in the second gripper slot 604 so as to extend out of the connector end opening 113. The internal components 200 may also be included in optoelectronic modules 600 or 700.

The first gripper slot 602 can be at least partially defined by a first top surface 607 and a first bottom surface 609. The second gripper slot 604 can be at least partially defined by a second top surface 610 and a second bottom surface 612. The first gripper slot 602 can have a first gap 614 at the front end 101 extending to a first slot side wall 616. The second gripper slot 604 can have a second gap 618 at the front end 101 extending to a second slot side wall 620.

Referring to FIG. 6E. The first gripper arm 606 and second gripper arm 608 are each laterally flexible relative to a longitudinal axis that extends from the front end 601 to the back end 603. The first gripper arm 606 has a top surface 638 and an opposite bottom surface 640 with an internal surface 642 and an external surface 644. The second gripper arm 608 has a top surface 646 and an opposite bottom surface 648 with an internal surface 650 and an external surface 652. Referring to FIG. 6B. The first gripper arm 606 can extend from a first side region 654 of the housing 108. The second gripper arm 608 can extend from a second side region 656 of the housing 108. A front portion of the external surface 644 of the first gripper arm 606 is exposed to the first gap 614. A back portion of the external surface 644 of the first gripper arm 606 is on the first slot side wall 616. A front portion of the external surface 652 of the second gripper arm 608 is exposed to the second gap 618. A back portion of the external surface 652 of the second gripper arm 608 is on the second slot side wall 620. The first gripper arm 606 can include a first inner protrusion 684 on the first internal surface 642 at a first end. The second gripper arm 608 can include a second inner protrusion 686 on the second internal surface 650 at a first end. The first gripper arm 606 can include a first indent 688 on the first external surface 644 opposite of the first inner protrusion 684. The second gripper arm 608 can include a second indent 690 on the second external surface 652 opposite of the second inner protrusion 686.

Figure 6A:
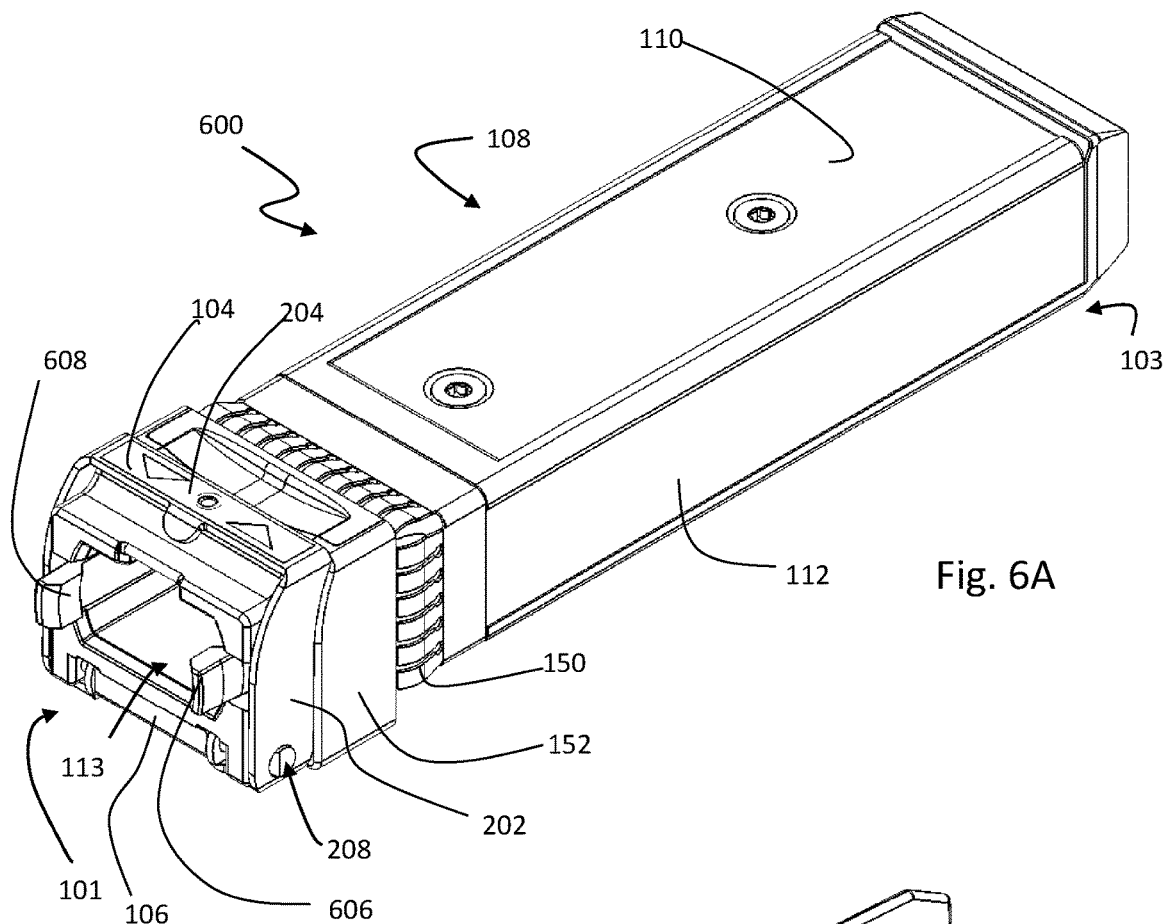
FIG. 6A is a top perspective view of another example bail-type optoelectronic module (without an attached communication cable) with separate gripper arms.
Figure 6B:
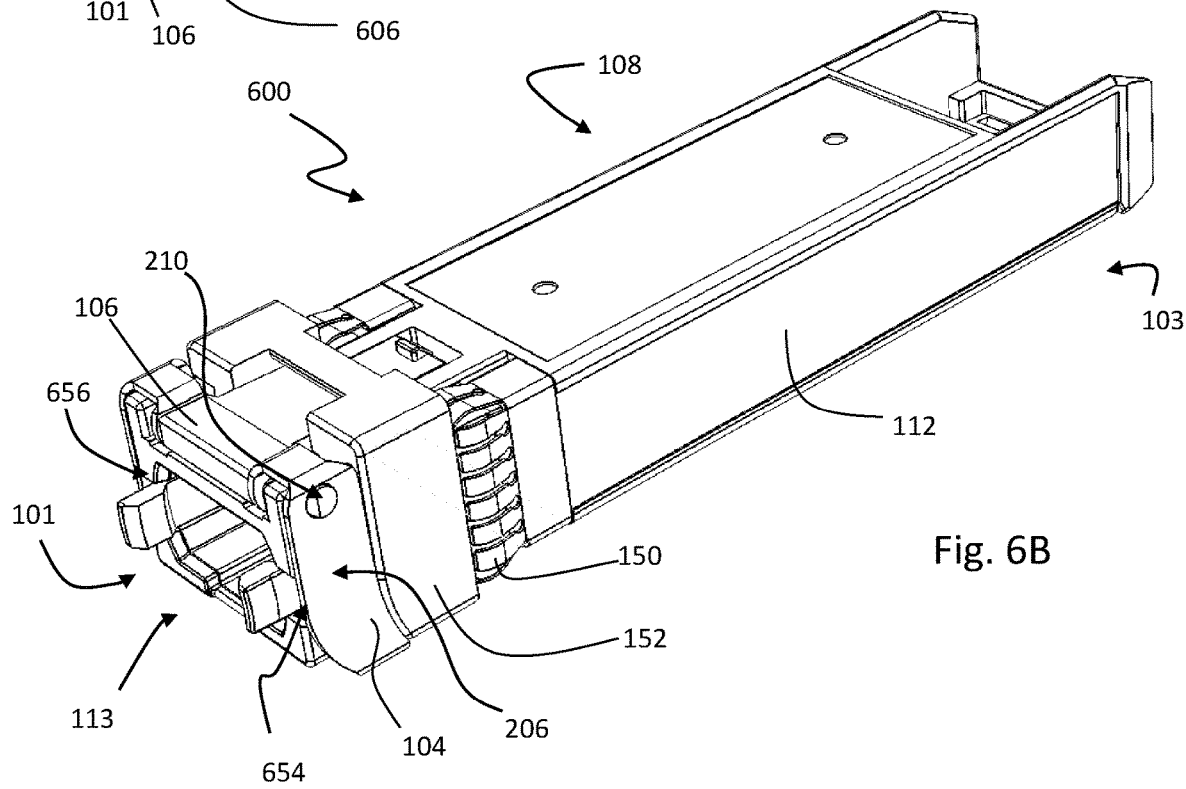
FIG. 6B is a bottom perspective view of the example bail-type optoelectronic module FIG. 6A.
Figure 6F:
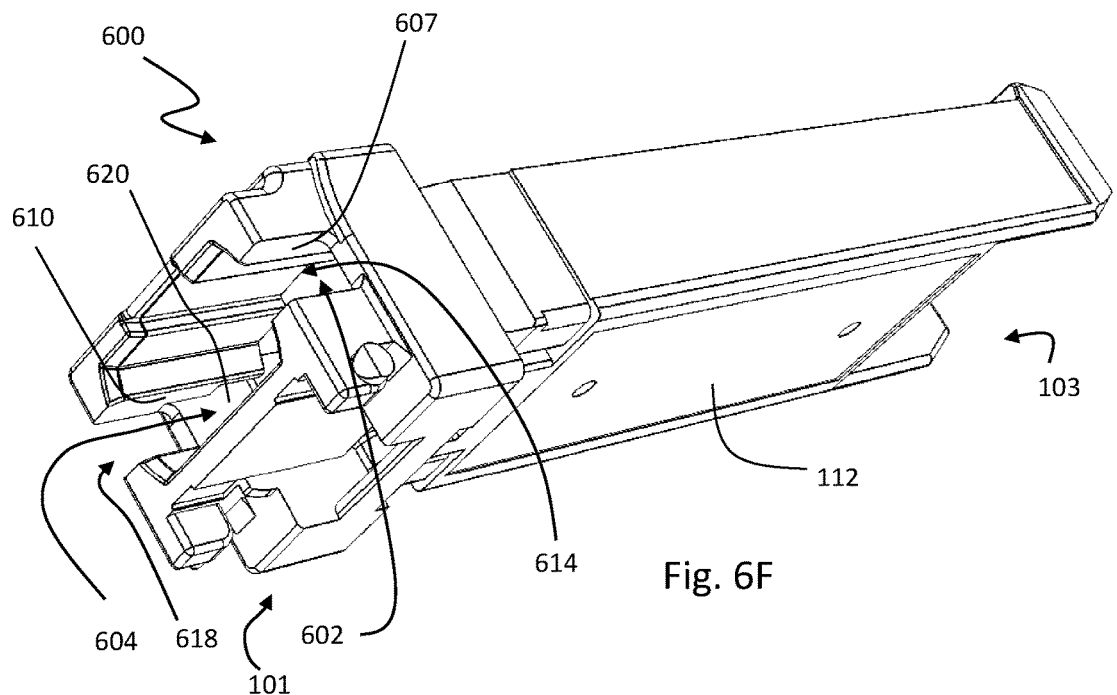
FIG. 6F is a right bottom perspective view of the example bail-type optoelectronic module of FIG. 6A with components removed to show the separate gripper arm slots of the housing without the gripper arms.
Figure 6G:
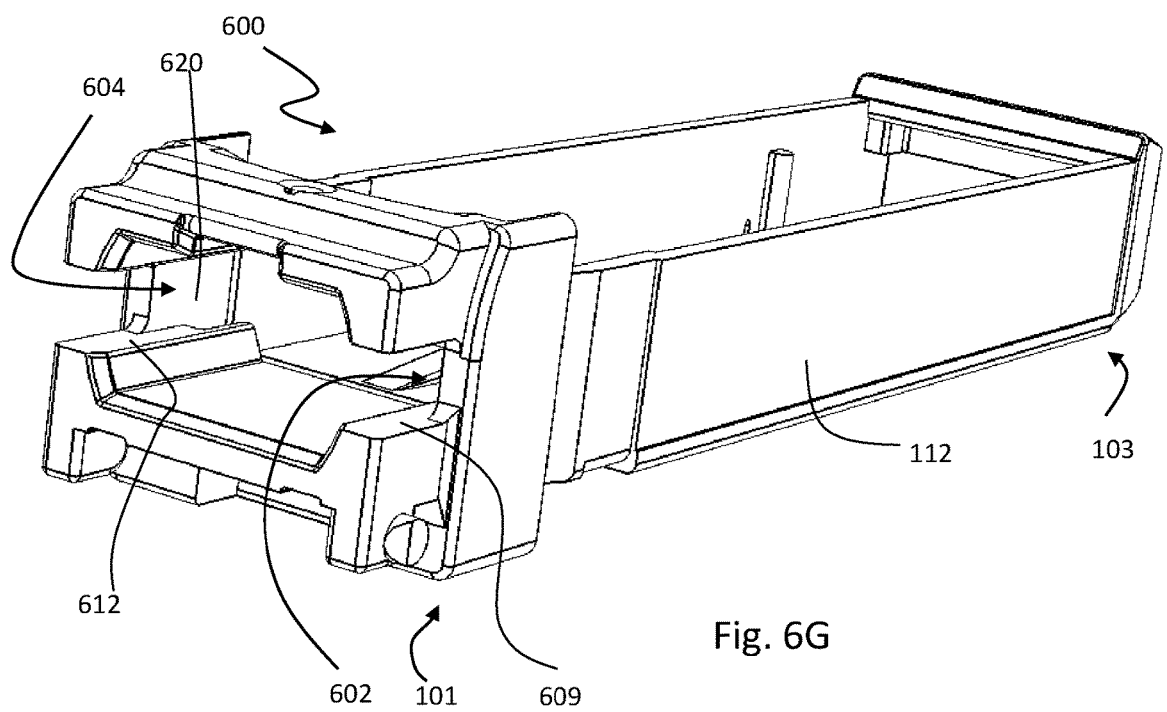
FIG. 6G is a right side perspective view of the example bail-type optoelectronic module of FIG. 6A with components removed to show the separate gripper arm slots of the housing without the gripper arms.
Figure 6H:
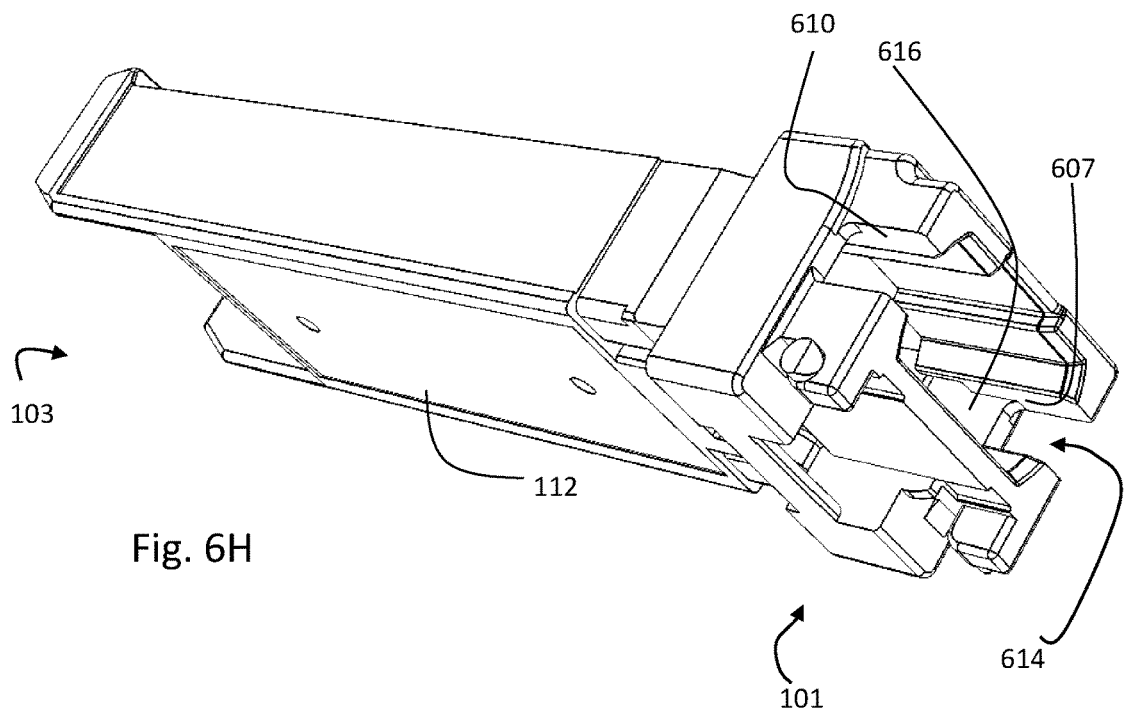
FIG. 6H is a left bottom perspective view of the example bail-type optoelectronic module of FIG. 6A with components removed to show the separate gripper arm slots of the housing without the gripper arms.
Figure 6I:
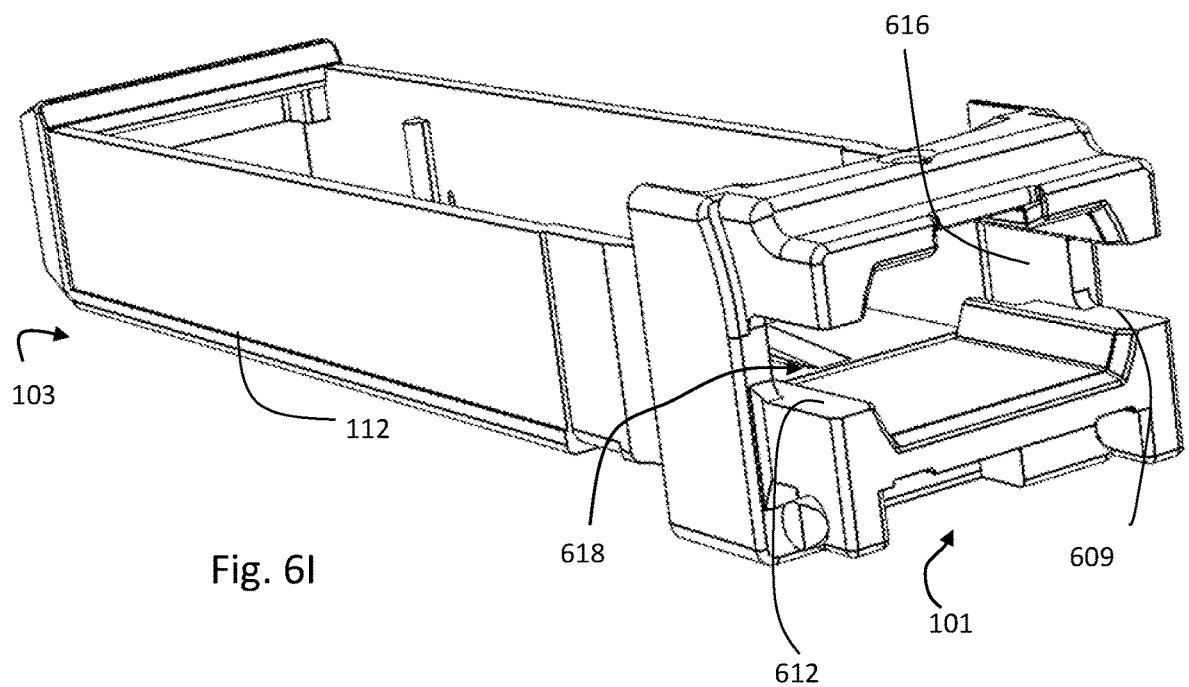
FIG. 6I is a left side perspective view of the example bail-type optoelectronic module of FIG. 6A with components removed to show the separate gripper arm slots of the housing without the gripper arms.
Figure 6J:
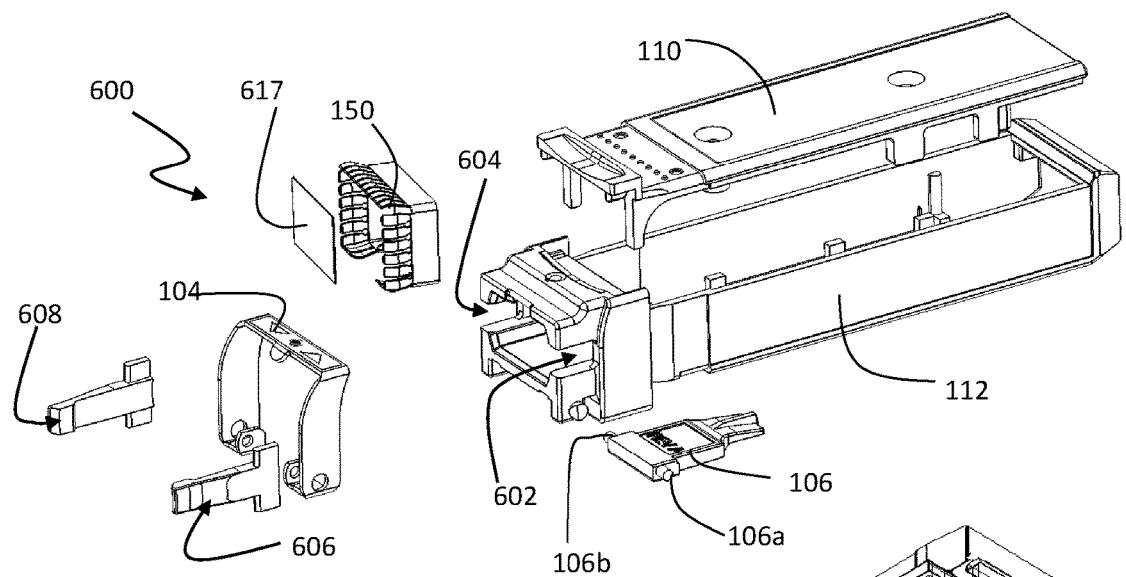
FIG. 6J is an exploded perspective view of the components of the example bail-type optoelectronic module of FIG. 6A.
Figure 6K:
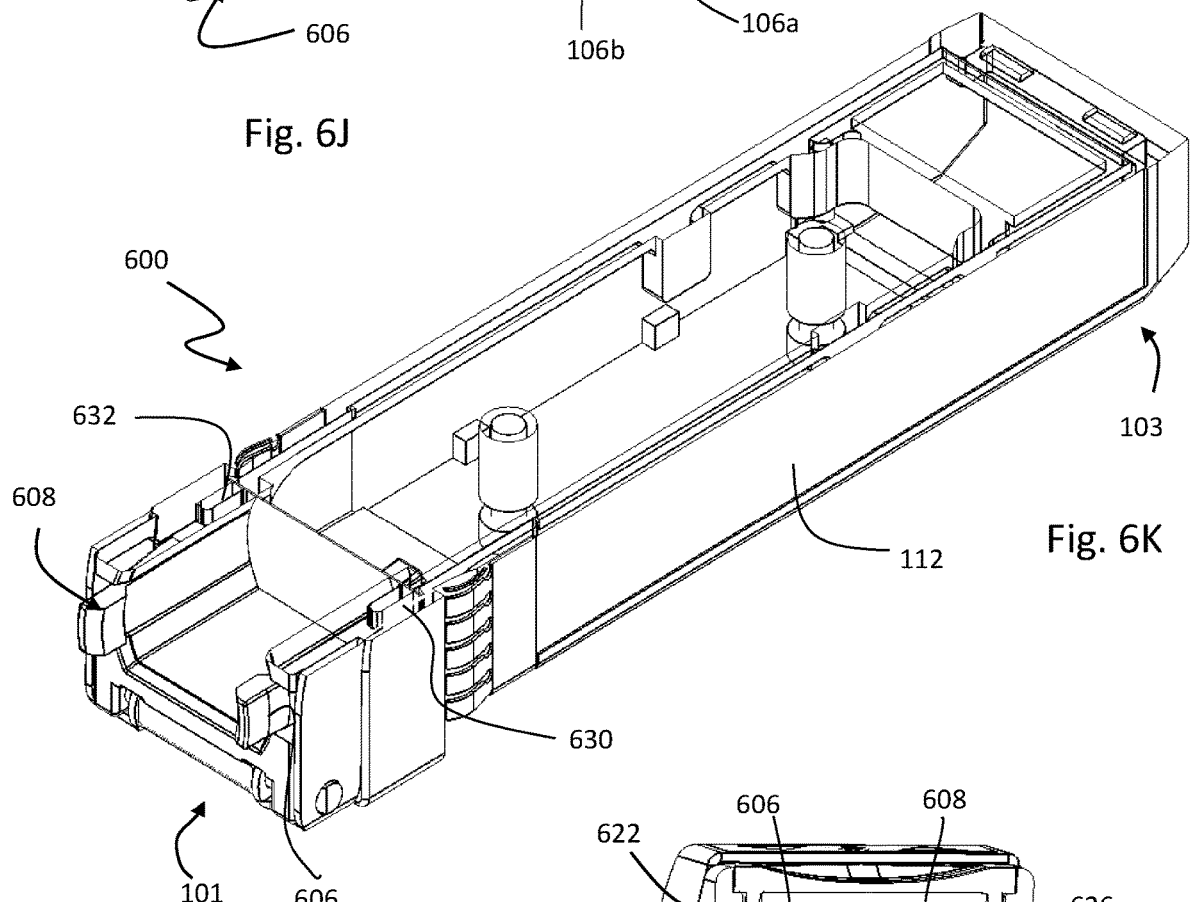
FIG. 6K is a top cross-sectional perspective view of the example bail-type optoelectronic module of FIG. 6A (longitudinal cross-section)
Figure 6L:
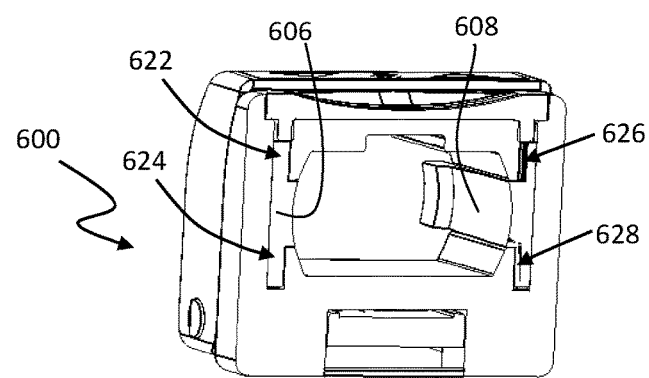
FIG. 6L is a cross-sectional perspective view of the example bail-type optoelectronic module of FIG. 6A (lateral cross-section)

As shown in FIG. 6L, the first gripper slot 602 has a first top notch 622 and a first bottom notch 624, wherein the first top notch 622 and the first bottom notch 624 extend away from each other and at an angle (e.g., orthogonal) from the first gripper slot 602. The second gripper slot 604 has a second top notch 626 and a second bottom notch 628, wherein the second top notch 626 and the second bottom notch 628 extend away from each other and at an angle (e.g., orthogonal) from the second gripper slot 604. Correspondingly, the first gripper arm 606 includes a first top wing 630 located in the first top notch 622 and a first bottom wing 631 located in the first bottom notch 624. Similarly, the second gripper arm 608 includes a second top wing 632 located in the second top notch 626 and a second bottom wing 633 located in the second bottom notch 628.

As shown in FIGS. 6A-6B and 6J, the optoelectronic module 600 can include a bail 104 at the front end 101 of the housing 108. The bail 104 includes a first arm 202 connected to a first end of a cross arm 204 and a second arm 206 connected to a second end of the cross arm 204. The first arm 202 can include a first latch aperture 208 opposite of the first end of the cross arm 204 and the second arm 206 includes a second latch aperture 210 opposite of the second end of the cross arm 204. The optoelectronic module 600 can include a pivot latch 106 operably coupled with the bail 104 to allow for rotation of the bail 104 relative to the alignment connector aperture 410. The pivot latch 106 can include a first axel 106a in the first latch aperture 208 and a second axel 106b in the second latch aperture 210.

Figure 7A:
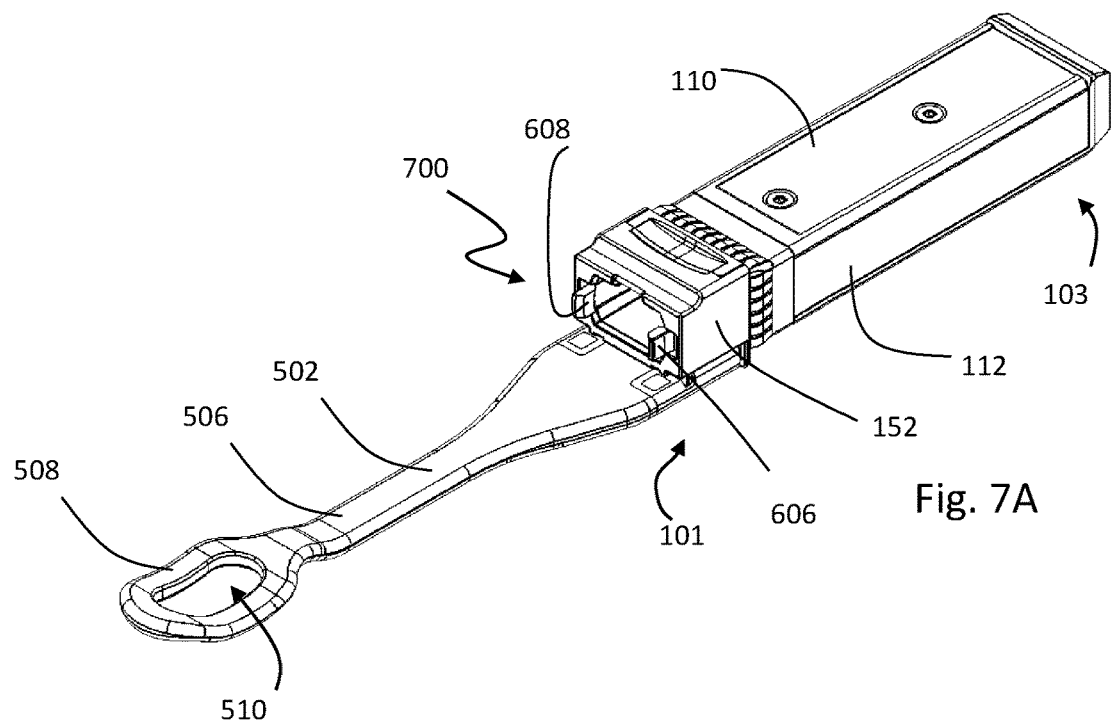
FIG. 7A is a top perspective view of another example pull-tab-type optoelectronic module (without an attached communication cable) with separate gripper arms.
Figure 7B:
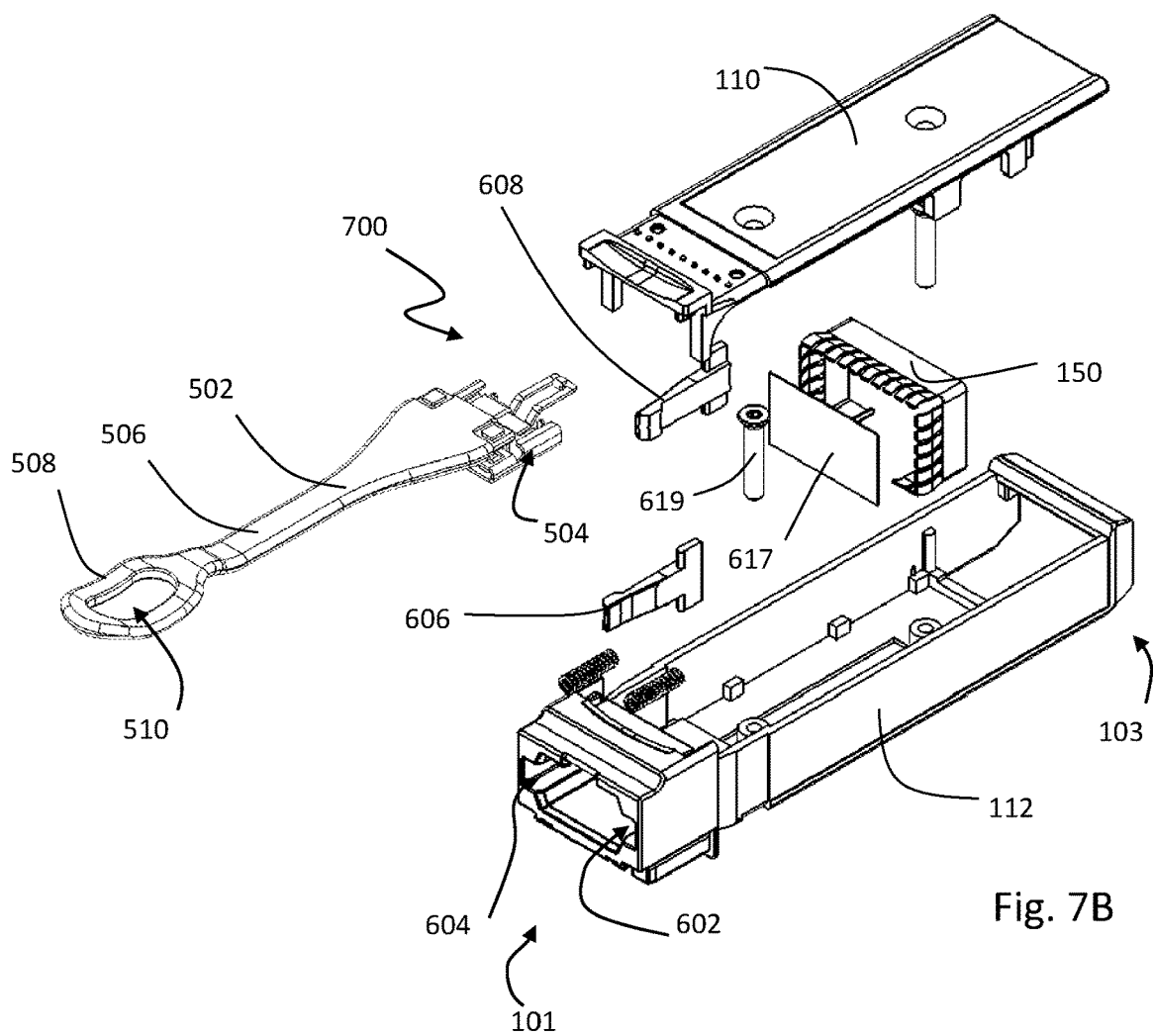
FIG. 7B is an exploded perspective view of the components of the example pull-tab-type optoelectronic module of FIG. 7A.
Figure 7C:
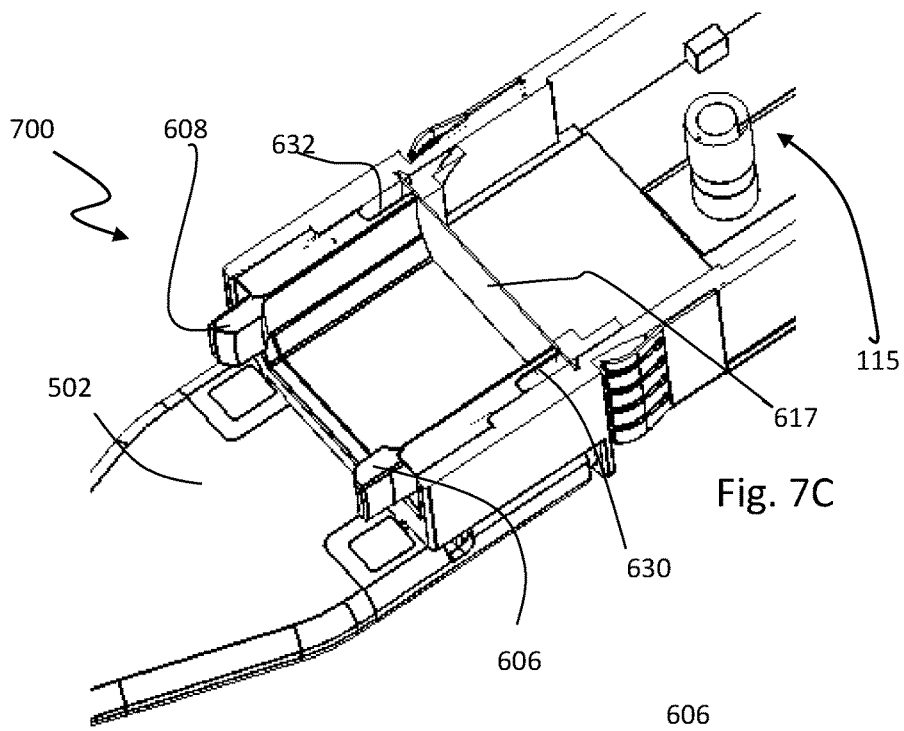
FIG. 7C is a top cross-sectional perspective view of a portion of the example bail-type optoelectronic module of FIG. 7A (longitudinal cross-section) showing the separate gripper arms in separate gripper arm slots.
Figure 7D:
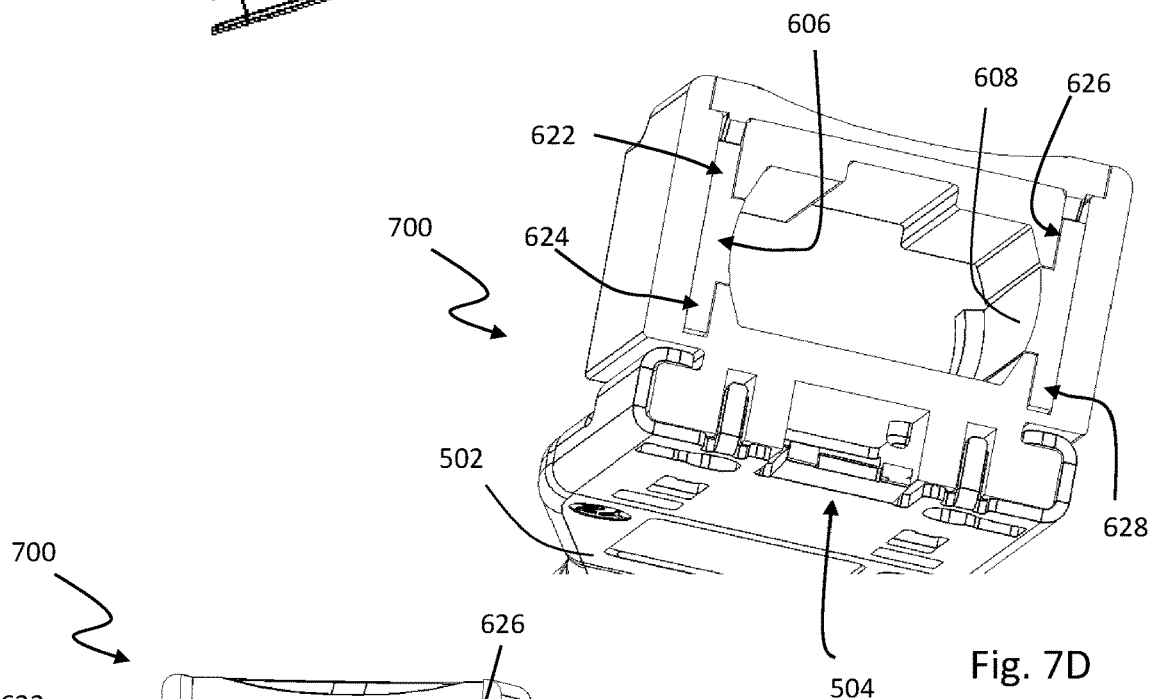
FIG. 7D is a top cross-sectional perspective view of a portion of the example bail-type optoelectronic module of FIG. 7A (longitudinal cross-section) showing the separate gripper arms in separate gripper arm slots.
Figure 7E:
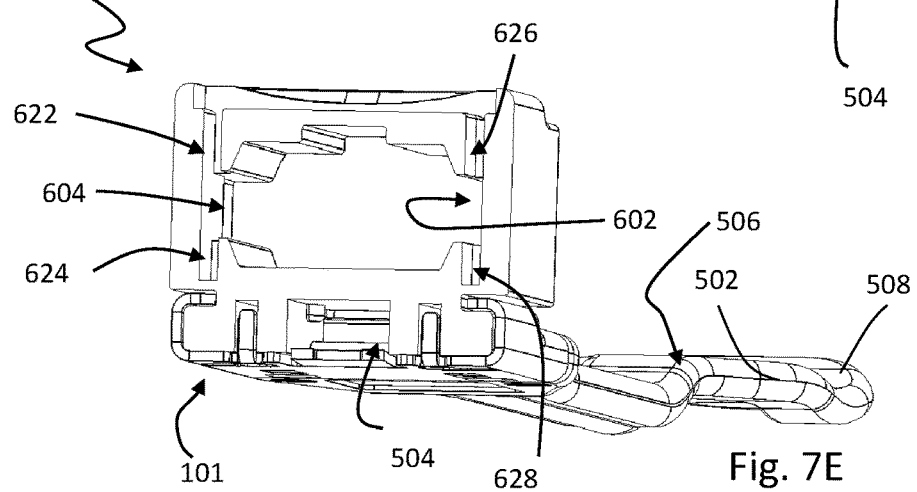
FIG. 7E is a top cross-sectional perspective view of a portion of the example bail-type optoelectronic module of FIG. 7A (longitudinal cross-section) showing the separate gripper arm slots without the separate gripper arms, the elements of the figures being arranged in accordance with at least one of the embodiments described herein, and which arrangement may be modified in accordance with the disclosure provided herein by one of ordinary skill in the art. The elements of each of the figures may be combined and arranged with the elements of the other figures. The figures are not drawn to scale and the various dimensions may vary.

The optoelectronic module 600 or 700 or any of the other embodiments may include a housing 108 having a top shell 110 coupled with a bottom shell 112, which can be connected together via a fastener 619 (see FIG. 7B). The optoelectronic module 600 or 700 or any of the other embodiments may include an EMF collar 150 around the housing 108 near a housing head 152. The optoelectronic module 600 can include a bail 104 in a retracted position adjacent to the housing head 152 opposite of the EMF collar 150. The optoelectronic module 700 can include a pull-tab 502 adjacent to the housing head 152. Additionally, the optoelectronic module 600 or 700 can include an edge connector 122 of the PCB 120 extending through a back aperture 103a of the back 103 of the housing 108. Optoelectronic module 600 or 700 may include the same components except for the bail 104 or pull-tab 502.

As shown in FIGS. 7A-7E, the optoelectronic module 700 can include a pull-tab 502 at the front end 101 of the housing 108. The pull-tab 502 can be oriented along a longitudinal axis of the housing 108 along with the first gripper arm 406 and the second gripper arm 408. The pull-tab 502 can include mounting components 504 mounted to a bottom 107 of the housing 108. The pull-tab 502 is mounted to a bottom shell 112 of the housing 108. The pull-tab 502 includes an elongate region 506 and an end region 508. The end region 508 includes a tab aperture 510.

As shown in FIGS. 6J and 7B, the optoelectronic module 600 or 700 can include an EMI shield 617 between the first and second gripper arms 406 and an interior cavity 115 of the housing 108. While not shown, the EMI shield 617 may include apertures to receive optical channels (e.g., optical fibers) therethrough for coupling the optoelectronic components of the module with those of the plug.

With reference to FIGS. 3A-3C, the configuration of the alignment connector 400 allows for the connector ferrule 139 to be coupled into the ferrule receptacle 426 to have better stabilized components and optical connection. As shown, the connector ferrule 139 can be installed by pressing it down into the ferrule receptacle 426. This can be done by allowing the optical fibers 137 of the ferrule assembly 136 to extend out of the gap 424.

With reference to FIGS. 6C-6E, the first and second gripper arms 606 and 608 can be installed by insertion into the internal cavity 115 and then sliding into the slots 602 and 604 from the back toward the front.

The present invention may be embodied in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An alignment connector for an optoelectronic module, wherein the alignment connector comprises:
    a unitary alignment connector body that comprises:
        a front end having a first gripper arm on a first side and a second gripper arm on a second side with an alignment connector aperture between the first gripper arm and the second gripper arm;
        a base extending from the front end to a back end and from the first side to the second side, the base having a bottom surface and a receptacle surface extending from the front end to the back end;
        the back end having a first back wall and a second back wall with a back gap therebetween; and
        a ferrule receptacle extending from the first back wall and the second back wall to a medial region where the alignment connector aperture extends from, and including a portion of the receptacle surface, the ferrule receptacle being defined by a first side wall having a first latch arm extending therefrom normal to the base and a second side wall having a second latch arm extending therefrom normal to the base.

2. The alignment connector of claim 1, wherein the first gripper arm and the second gripper arm are each laterally flexible relative to a longitudinal axis that extends from the front end to the back end, wherein:
    the first gripper arm has a top surface and an opposite bottom surface with an internal surface and an external surface and the first gripper arm extends from a first side region of the body; and
    the second gripper arm has a top surface and an opposite bottom surface with an internal surface and an external surface and the second gripper arm extends from a second side region of the body.

3. The alignment connector of claim 2, wherein:
    the top surface of the first gripper arm is exposed to a first top gap between the first gripper arm and a first top portion of the body;
    the bottom surface of the first gripper arm is exposed to a first bottom gap between the first gripper arm and a first bottom portion of the body;
    the top surface of the second gripper arm is exposed to a second top gap between the second gripper arm and a second top portion of the body; and
    the bottom surface of the second gripper arm is exposed to a second bottom gap between the second gripper arm and a second bottom portion of the body.

4. The alignment connector of claim 3, wherein the alignment connector aperture is defined at least partially by:
    a bottom aperture surface at a bottom;
    the first gripper arm, the first top portion, and the first bottom portion on the first side;
    the second gripper arm, the second top portion, and the second bottom portion on the second side, and a first top aperture surface, a second top aperture surface, and a top aperture recess surface of a top aperture recess at a top.

5. The alignment connector of claim 2, wherein:
the first gripper arm includes a first inner protrusion on the first internal surface at an end opposite from the first side region of the body and/or a first indent on the first external surface of the first gripper arm opposite of the first inner protrusion; and
the second gripper arm includes a second inner protrusion on the second internal surface at an end opposite from the second side region of the body and/or a second indent on the second external surface of the first gripper arm opposite of the second inner protrusion.

6. The alignment connector of claim 1, wherein the ferrule receptacle includes:
the first latch arm having a first latch protrusion extending inwardly at an angle from an inner surface of the first latch arm; and
the second latch arm having a second latch protrusion extending inwardly at an angle from an inner surface of the second latch arm, such that the first latch protrusion and second latch protrusion are generally pointing at each other.

7. The alignment connector of claim 6, wherein:
the first side wall includes a first wing extending outwardly at an angle from an outer surface of the first side wall; and
the second side wall includes a second wing extending outwardly at an angle from an outer surface of the second side wall.

8. The alignment connector of claim 1, wherein the receptacle surface includes:
a ferrule body surface between the first latch arm and the second latch arm; and
a ferrule bracket recess between the ferrule body surface and both the first back wall and the second back wall.

9. An optoelectronic module comprising:
a housing having an interior cavity with a connector end opening at a front end;
the alignment connector of claim 1 at least partially located in the interior cavity and extending through and out of the connector end opening.

10. The optoelectronic module of claim 9, further comprising a ferrule assembly having a connector ferrule located in the ferrule receptacle, wherein the first latch arm and the second latch arm cooperate to retain the connector ferrule in the ferrule receptacle.

11. The optoelectronic module of claim 10, wherein:
a ferrule optical fiber connected at an end to the connector ferrule extends through the back gap between the first back wall and the second back wall;
the ferrule optical fiber is connected at an end to a lens ferrule of the ferrule assembly, and the lens ferrule is optically coupled with a transmitter array.

12. The optoelectronic module of claim 9, further comprising a bail at the front end of the housing.

13. The optoelectronic module of claim 9, further comprising a pull-tab at the front end of the housing.

14. The alignment connector of claim 1, wherein the unitary alignment connector body further comprises:

the first gripper arm and the second gripper arm are each laterally flexible relative to a longitudinal axis that extends from the front end to the back end,
the first gripper arm has a top surface and an opposite bottom surface with an internal surface and an external surface and the first gripper arm extends from a first side region of the body, and the first gripper arm includes a first inner protrusion on the first internal surface at an end opposite from the first side region of the body; and
the second gripper arm has a top surface and an opposite bottom surface with an internal surface and an external surface and the second gripper arm extends from a second side region of the body, and the second gripper arm includes a second inner protrusion on the second internal surface at an end opposite from the second side region of the body, wherein the first inner protrusion and second inner protrusion protrude toward each other.

15. The alignment connector of claim 14, further comprising:
a first indent on the first external surface of the first gripper arm opposite of the first inner protrusion; and
a second indent on the second external surface of the first gripper arm opposite of the second inner protrusion.

16. The alignment connector of claim 14, wherein:
the top surface of the first gripper arm is exposed to a first top gap between the first gripper arm and a first top portion of the body;
the bottom surface of the first gripper arm is exposed to a first bottom gap between the first gripper arm and a first bottom portion of the body;
the top surface of the second gripper arm is exposed to a second top gap between the second gripper arm and a second top portion of the body; and
the bottom surface of the second gripper arm is exposed to a second bottom gap between the second gripper arm and a second bottom portion of the body.

17. The alignment connector of claim 14, wherein the ferrule receptacle includes:
the first latch arm having a first latch protrusion extending inwardly at an angle from an inner surface of the first latch arm; and
the second latch arm having a second latch protrusion extending inwardly at an angle from an inner surface of the second latch arm, such that the first latch protrusion and second latch protrusion are generally pointing at each other.

18. The alignment connector of claim 17, wherein:
the first side wall includes a first wing extending outwardly at an angle from an outer surface of the first side wall; and
the second side wall includes a second wing extending outwardly at an angle from an outer surface of the second side wall.

19. An optoelectronic module comprising:
a housing having an interior cavity with a connector end opening at a front end;
the alignment connector of claim 14 at least partially located in the interior cavity and extending through and out of the connector end opening.

* * * * *